(12) United States Patent
Chou et al.

(10) Patent No.: US 11,338,500 B2
(45) Date of Patent: May 24, 2022

(54) SYSTEMS AND METHODS FOR MOBILE DEVICE SURFACE PROTECTION

(71) Applicant: Superior Communications, Inc., Irvindale, CA (US)

(72) Inventors: Vivian Wei-Fen Chou, Diamond Bar, CA (US); Eugene Chun, Brea, CA (US)

(73) Assignee: SUPERIOR COMMUNICATIONS, INC., Irwindale, CA (US)

( * ) Notice: Subject to any disclaimer, the term of this patent is extended or adjusted under 35 U.S.C. 154(b) by 0 days.

(21) Appl. No.: 16/734,136

(22) Filed: Jan. 3, 2020

(65) Prior Publication Data

US 2020/0215745 A1 Jul. 9, 2020

Related U.S. Application Data

(60) Provisional application No. 62/788,636, filed on Jan. 4, 2019.

(51) Int. Cl.
*B29C 63/02* (2006.01)
*B29C 63/00* (2006.01)
(Continued)

(52) U.S. Cl.
CPC .......... *B29C 63/02* (2013.01); *B29C 63/0004* (2013.01); *B29C 63/22* (2013.01);
(Continued)

(58) Field of Classification Search
CPC . B29C 63/02; B29C 63/0047; B29C 63/0004; B29C 63/22; B29C 63/0056; B29C 63/0095; B29C 2063/0008; B29C 2063/0004; B29C 2063/027; B29C 65/782; B29C 65/7835; B29C 65/48; B29C 66/345; B29C 66/342; B29C 66/861; B29C 65/7802; B29L 2031/3437; B29L 2031/3475; B32B 37/003; B32B 37/0007;
(Continued)

(56) References Cited

U.S. PATENT DOCUMENTS 9,580,626 B2 * 2/2017 Colby ..................... B32B 27/08
2009/0186181 A1 * 7/2009 Mase ..................... B29C 63/02
428/40.1

(Continued)

FOREIGN PATENT DOCUMENTS

JP 3180690 U * 12/2012

OTHER PUBLICATIONS

Machine translation of JP 3180690 date unknown.*

*Primary Examiner* — John L Goff, II
(74) *Attorney, Agent, or Firm* — Snell & Wilmer LLP

(57) ABSTRACT

Systems and methods for applying a protective layer to an outer surface of a mobile device. A system may include a protective layer for an outer surface of a mobile device and an alignment layer coupled to the protective layer. A frame may define a cavity configured to receive the mobile device. The frame may include a surface positioned outside of the cavity and configured to support the alignment layer and configured to be depressed relative to the mobile device to reduce a distance between the protective layer and the outer surface of the mobile device when the mobile device is positioned in the cavity.

18 Claims, 20 Drawing Sheets

(51) Int. Cl.
*B29C 63/22* (2006.01)
*B29C 65/48* (2006.01)
*B32B 37/00* (2006.01)
*B32B 37/14* (2006.01)
*H04M 1/02* (2006.01)
*B29C 65/78* (2006.01)
*B29L 31/34* (2006.01)

(52) U.S. Cl.
CPC .......... *B29C 65/48* (2013.01); *B29C 65/7802* (2013.01); *B32B 37/003* (2013.01); *B32B 37/0046* (2013.01); *B32B 37/14* (2013.01); *H04M 1/0249* (2013.01); *B29C 2063/0008* (2013.01); *B29C 2063/027* (2013.01); *B29L 2031/3437* (2013.01); *B29L 2031/3475* (2013.01)

(58) Field of Classification Search
CPC . B32B 38/1833; B32B 38/1841; B32B 38/10; B32B 2457/20; B32B 2457/202; B32B 2457/204; B32B 2457/206; B32B 2457/208; B32B 2037/109
USPC .................................................. 156/249, 714
See application file for complete search history.

(56) References Cited

U.S. PATENT DOCUMENTS

2012/0211168 A1\* 8/2012 Patel ................. B29C 63/02
156/391
2017/0001364 A1\* 1/2017 MacDonald ........ B29C 65/7802

\* cited by examiner

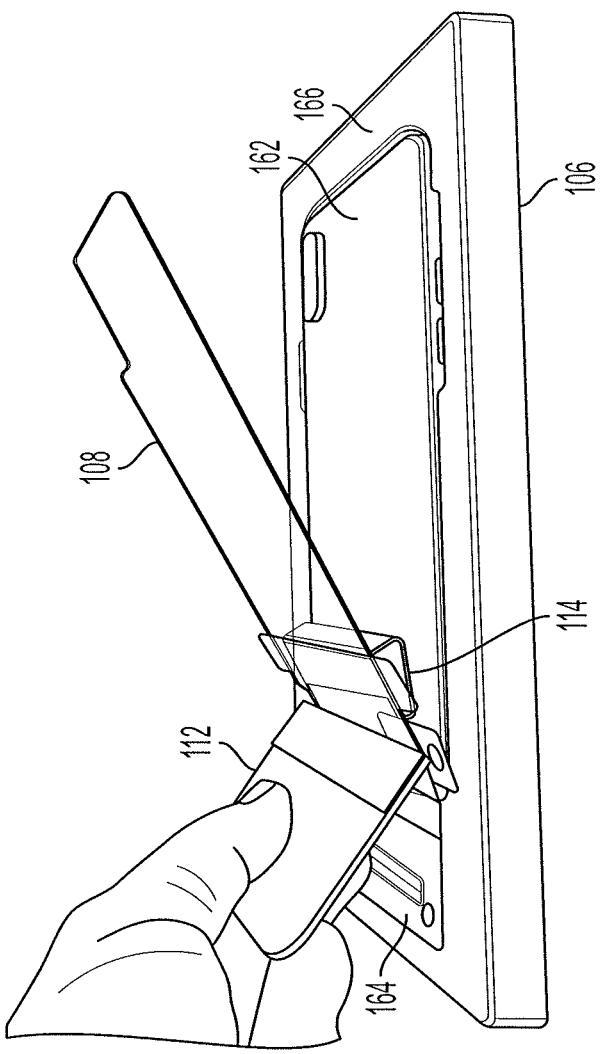
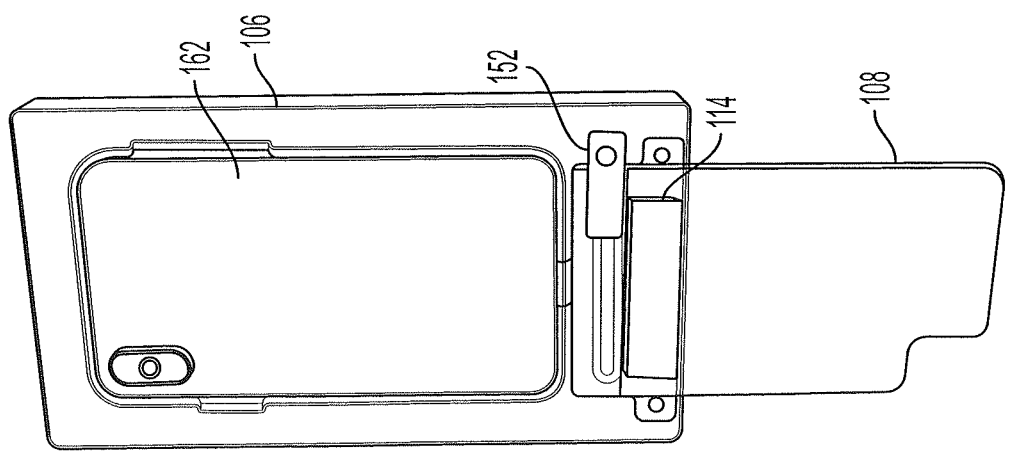

SYSTEMS AND METHODS FOR MOBILE DEVICE SURFACE PROTECTION

RELATED APPLICATIONS

This application claims the benefit of U.S. Provisional Patent Application No. 62/788,636 entitled "SYSTEMS AND METHODS FOR MOBILE DEVICE SURFACE PROTECTION" filed on Jan. 4, 2019, the entire contents of this application is hereby incorporated by reference herein.

BACKGROUND

Mobile devices have become more common in everyday life. Individuals commonly carry around one or more mobile devices for purposes of telephone calls, email communication, text messaging, geographic navigation, or web browsing, among other features. In addition, mobile devices have become more sophisticated and expensive, and are commonly offered in a variety of sizes and outer dimensions by multiple different manufacturers or even by the same manufacturer.

As such, users have a desire to protect their mobile devices due to their exposure to a variety of different external substances through everyday use, such as dirt or hand oils. In addition, users have a desire to protect their mobile devices from impact or other damage due to the cost of replacing or repairing such mobile devices.

However, due to the variety of sizes and outer dimensions of mobile devices offered by manufacturers, it may be difficult for a user to properly size and apply an outer surface protector to a mobile device. In addition, improvements are desired in the ease and quickness by which an outer surface protector may be applied to a mobile device, to protect multiple surfaces of the mobile device.

SUMMARY

Apparatuses, systems, and methods disclosed herein are directed to application of an outer surface protector to a mobile device. The surface of the mobile device to be protected may be a screen of the mobile device, or may be a non-screen surface of the mobile device such as a back surface of the mobile device. Embodiments disclosed herein may include a frame for holding multiple different sizes of mobile devices for application of an outer surface protector. Embodiments disclosed herein may include application of an outer surface protector having multiple backing portions, which may be selectively separated from portions of a protective layer to expose a respective portion of the protective layer. The protective layer may be applied to a non-screen or back surface of the mobile device.

Embodiments disclosed herein may include a system including a protective layer for an outer surface of a mobile device. The system may include an alignment layer coupled to the protective layer. The system may include a frame defining a cavity configured to receive the mobile device, the frame including a surface positioned outside of the cavity and configured to support the alignment layer and configured to be depressed relative to the mobile device to reduce a distance between the protective layer and the outer surface of the mobile device when the mobile device is positioned in the cavity.

Embodiments disclosed herein may include a method including positioning a mobile device in a cavity of a frame. The method may include supporting an alignment layer with a surface positioned outside of the cavity, the alignment layer coupled to a protective layer for an outer surface of the mobile device. The method may include depressing the surface positioned outside the cavity relative to the mobile device to move the protective layer towards the outer surface of the mobile device. The method may include applying the protective layer to the outer surface of the mobile device.

Embodiments disclosed herein may include a system including a frame defining a cavity configured to receive a mobile device. The system may include an outer surface protector for the mobile device, the outer surface protector configured to couple to the frame and extend along the cavity and including a protective layer and a backing layer coupled to the protective layer, the protective layer configured to couple to an outer surface of the mobile device, and the backing layer including one or more cuts separating the backing layer into at least two portions each configured to be selectively separated from the protective layer to expose a respective portion of the protective layer.

Embodiments disclosed herein may include a method including positioning a mobile device in a cavity of a frame. The method may include separating a first portion of a backing layer of an outer surface protector for the mobile device from a first portion of a protective layer of the outer surface protector, the outer surface protector being coupled to the frame and the backing layer including one or more cuts separating the first portion of the backing layer from a second portion of the backing layer. The method may include applying the first portion of the protective layer to an outer surface of the mobile device while the second portion of the backing layer remains coupled to a second portion of the protective layer. The method may include separating the second portion of the backing layer from the second portion of the protective layer. The method may include applying the second portion of the protective layer to the outer surface of the mobile device.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 27 illustrates a top perspective view of a mobile device positioned within a cavity of the frame shown in FIG. 21.

FIG. 28 illustrates a side perspective view of a portion of an outer surface protector being applied to an outer surface of a mobile device.

DETAILED DESCRIPTION

Figure 1:
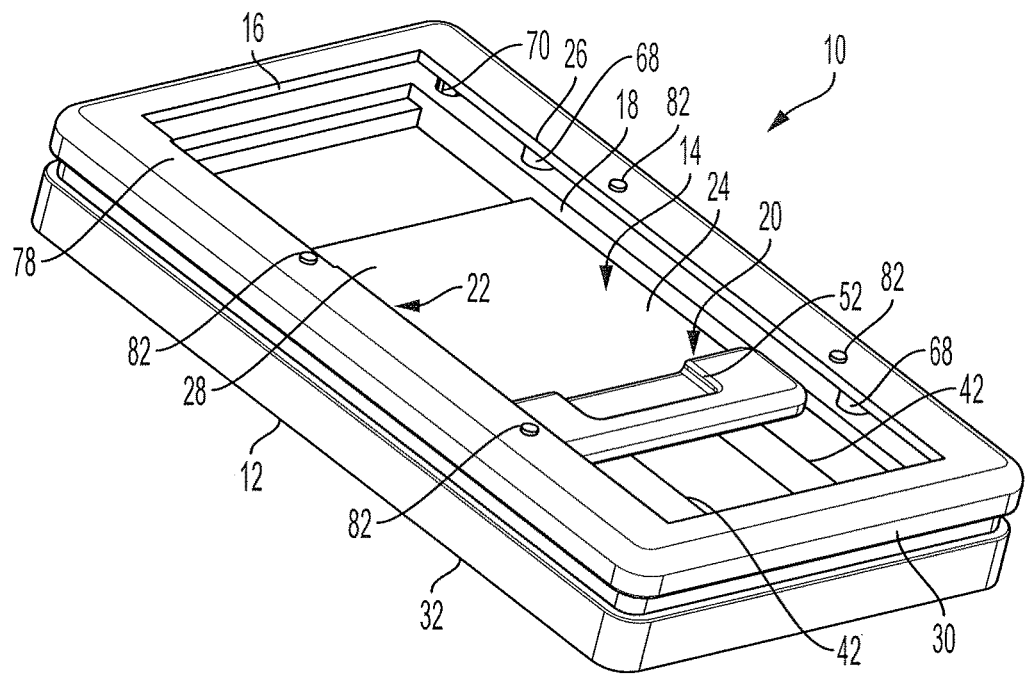
FIG. 1 illustrates a perspective view of a frame according to an embodiment of the present disclosure.

FIG. 1 illustrates components for use in a system 10 for applying a protective layer to an outer surface of a mobile device. A mobile device may comprise a mobile communication device such as an iPhone®, iPad®, or Apple Watch®, or a Samsung Galaxy® or the like. A mobile device may comprise a tablet computer or other form of computing device or electronic device that is carried by a user. Such mobile devices are often exposed to a variety of different types of external environmental substances, such as dirt or liquid, and are often exposed to hand oils or other substances provided by the user. As such, it is often beneficial to provide a protective layer to an outer surface of the mobile device, to protect the mobile device from such substances. The protective layer may also reduce the possibility of damage to the mobile device caused by external impact such as dropping the mobile device or other forces applied to the mobile device.

FIG. 1 illustrates a perspective view of a frame 12 that may be utilized to apply a protective layer to an outer surface of a mobile device. The frame 12 may define a cavity 14 configured to receive a mobile device. The frame 12 may include one or more side surfaces 16, 18, 20, 22 defining sides of the cavity 14. As shown in FIG. 1, the frame 12 may include four side surfaces 16, 18, 20, 22 bounding four sides of the cavity 14. The side surfaces 16, 18, 20, 22 may extend from a bottom 24 of the cavity 14 to an upper boundary 26 of the cavity 14. The side surfaces 16, 18, 20, 22 may comprise walls that bound the cavity 14. A bottom surface 28 of the frame 12 may define a bottom of the cavity 14. The top of the cavity 14 may be open for receiving the mobile device. The cavity 14 may comprise a defined area for receiving the mobile device. In one embodiment, the bottom surface 28 of the frame may include an anti-slip material to prevent the mobile device from sliding within the cavity 14.

Figure 2:
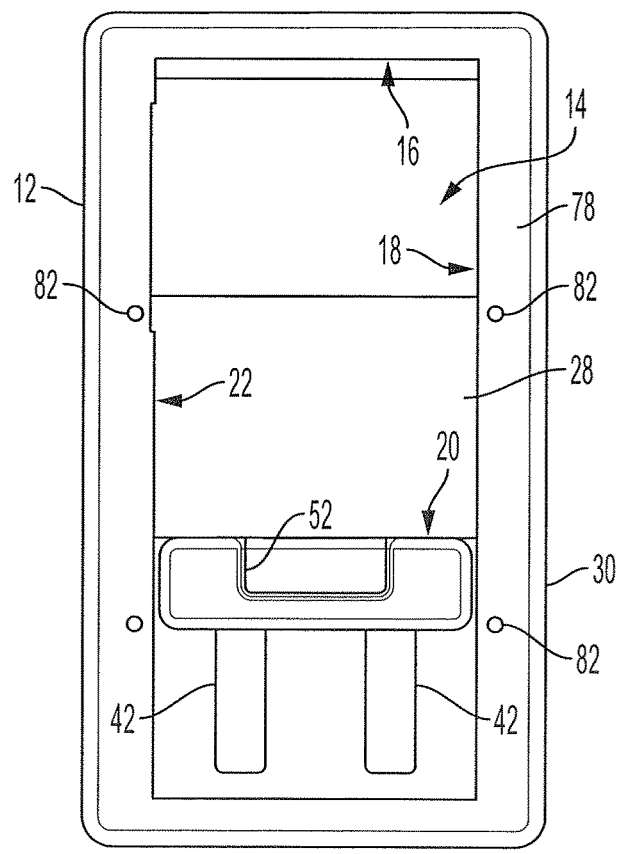
FIG. 2 illustrates a top view of the frame shown in FIG. 1.

FIG. 2 illustrates a top view of the body of the frame 12 apparatus.

Figure 3:
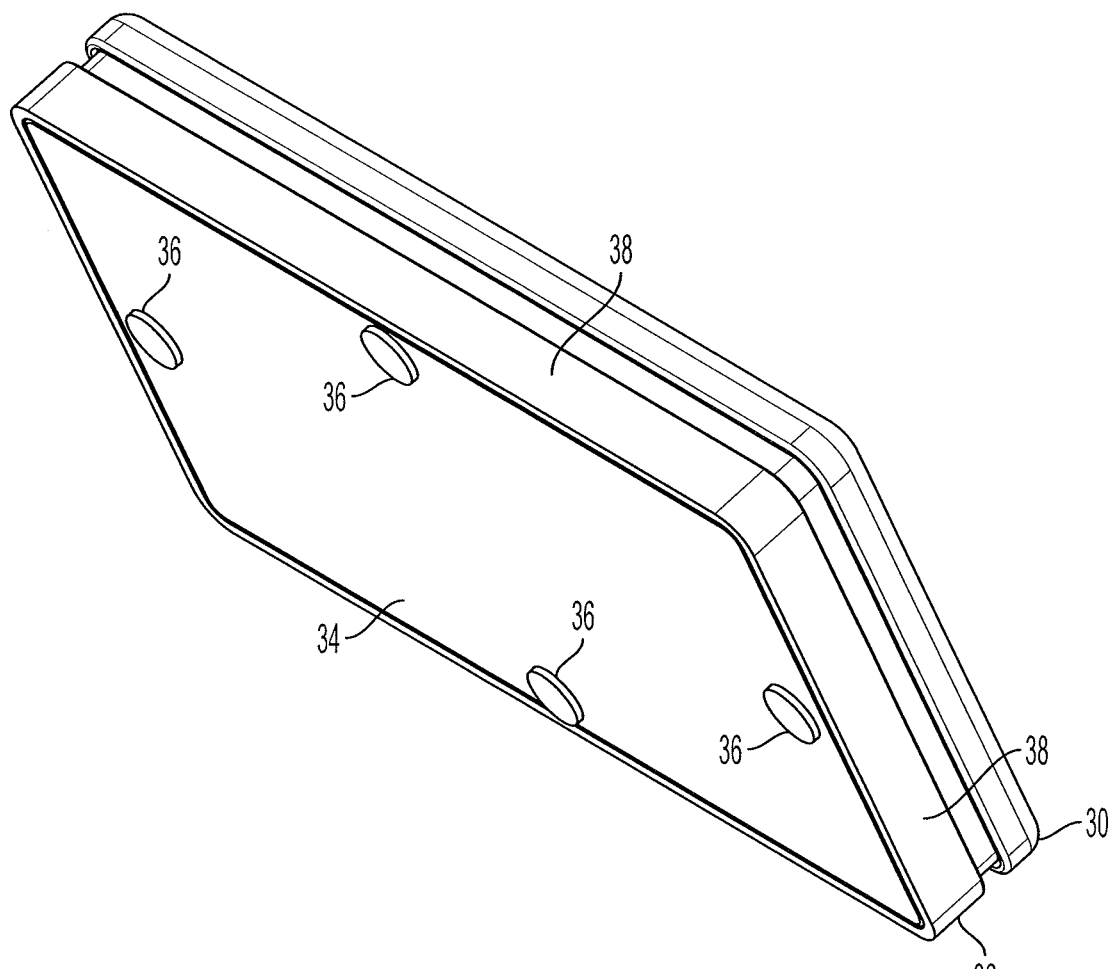
FIG. 3 illustrates a rear perspective view of the frame shown in FIG. 1.

The frame 12 may include multiple components. As shown in FIG. 1, the frame 12 may include a top frame 30 coupled to a base 32. The base 32 may comprise a lower portion of the frame 12 and may be configured to be set upon a supporting surface such as a table or other surface. As shown in FIG. 3, the base 32 may include a back surface 34 defining a back of the frame 12 and may include support feet 36 in the form of pads or other supports for supporting the frame 12 upon a surface. The base 32 may include outer side surfaces 38 that define an outer surface of the base 32.

Figure 4:
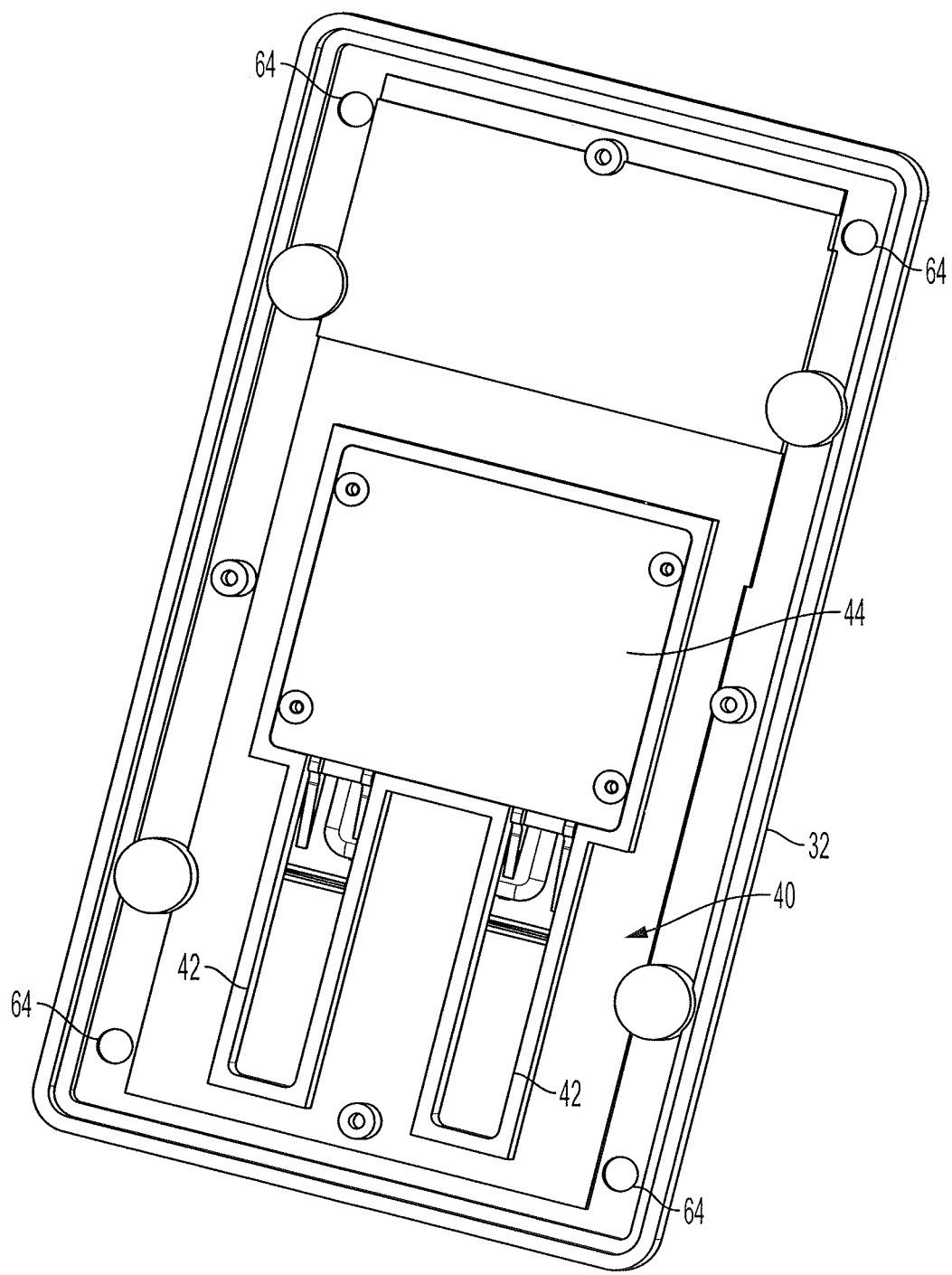
FIG. 4 illustrates a rear perspective view of the frame shown in FIG. 1 with the back surface removed.

FIG. 4 illustrates a rear view of the base 32 with the back surface 34 removed. The base 32 may include an interior cavity 40 that is positioned beneath the cavity 14 for receiving the mobile device. The base 32 may include channels 42 that extend through the surface of the base 32 and allow a body of a movable side surface 20 (more clearly shown in FIG. 7) to move along the channels 42.

The base 32 may include a plate 44 configured to hold a body 46 of a movable side surface 20 (more clearly shown in FIG. 7) in position.

Figure 5:
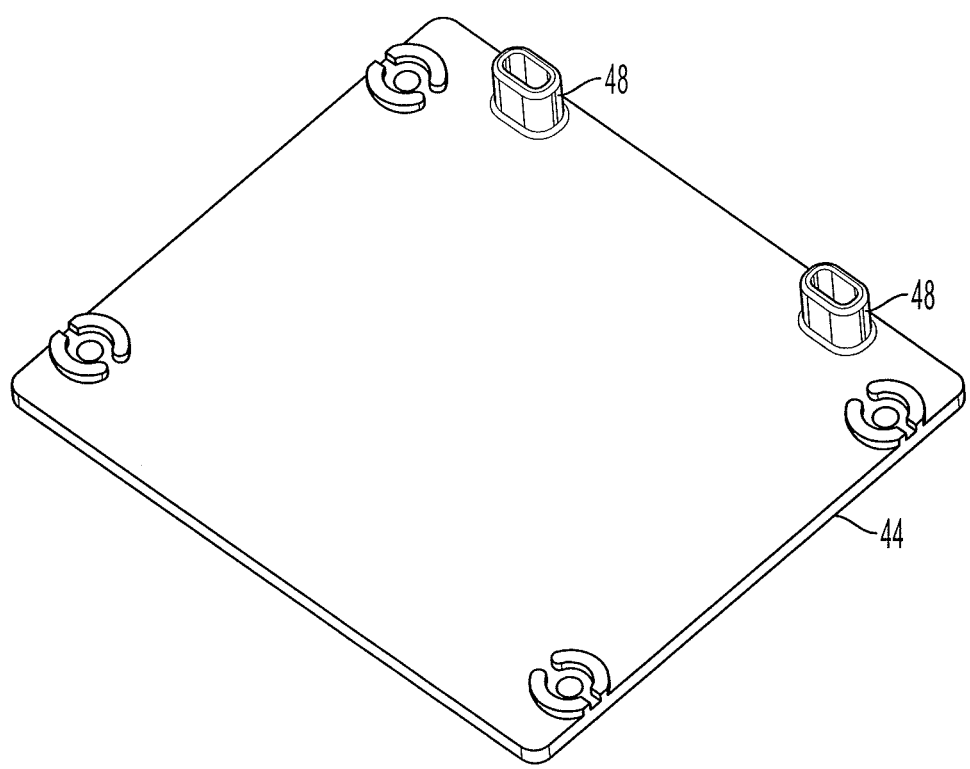
FIG. 5 illustrates a top perspective view of a plate of the base of the frame shown in FIG. 1.
Figure 6:
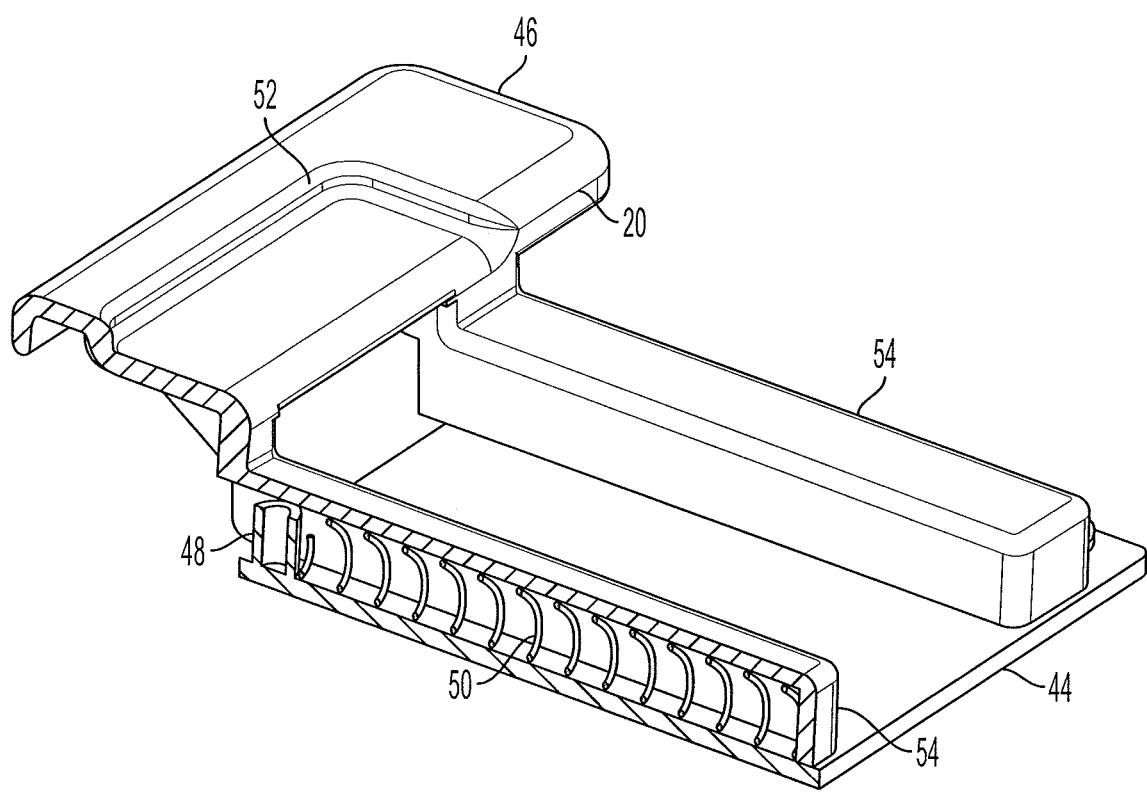
FIG. 6 illustrates a cross-sectional view of a body of a movable surface upon the plate shown in FIG. 5.

FIG. 5 illustrates a top view of the plate 44 removed from the base 32 and rotated to show the opposite side of the plate 44 than shown in FIG. 4. The plate 44 may include protrusions 48 extending upward from a surface of the plate 44. As shown in FIG. 6 in cross section, the protrusions 48 may be configured to contact springs 50 of the body 46 of the movable side surface 20.

Referring back to FIG. 1, one of the side surfaces 20 of the cavity 14 may comprise a movable surface. The movable surface 20 may comprise a movable wall and may be coupled to a handle 52 configured to be moved by a user. The movable surface 20 may be configured to be slid towards and away from the cavity 14. The movable surface 20 accordingly may vary the size of the cavity 14 and may be utilized so that the frame 12 may accommodate multiple different sizes of mobile devices.

Figure 7:
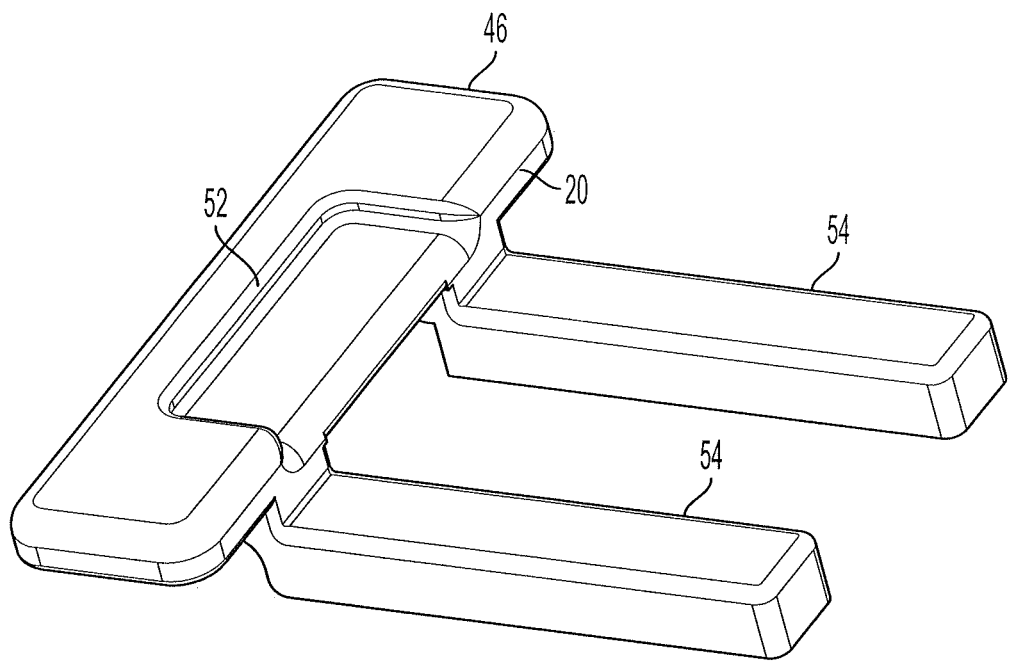
FIG. 7 illustrates a top perspective view of a body of a movable surface shown in FIG. 1.

FIG. 7 illustrates a top perspective view of the movable surface 20. The movable surface 20 may be coupled to a body 46 including an indentation that forms the handle 52 for a user to grip. The body 46 may include arms 54 configured to slide along the channels 42 of the base 32 (marked in FIG. 4).

Figure 8:
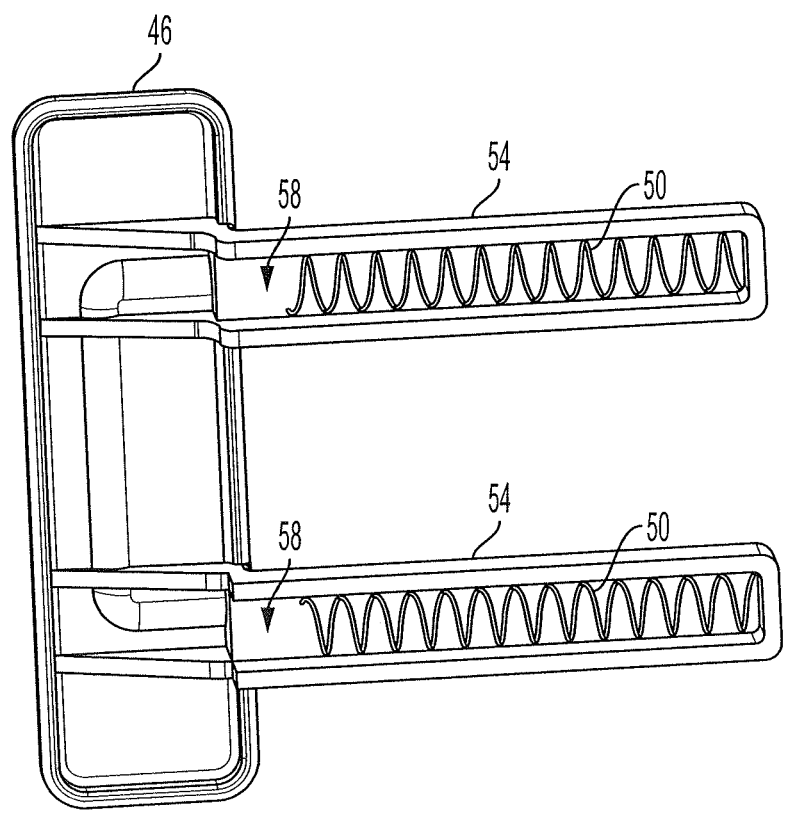
FIG. 8 illustrates a bottom perspective view of the body shown in FIG. 7.

FIG. 8 illustrates a bottom perspective view of the body 46. Springs 50 may be positioned in cavities 58 of the arms 54 and may be configured to press against the protrusions 48 of the plate 44 (as shown in cross section in FIG. 6). The springs 50 may press against the protrusions 48 (as shown in cross section in FIG. 6) to bias the movable surface 20 in a direction towards the cavity 14. As such, if a user pulls the movable surface 20 in a direction away from the cavity 14, the springs 50 compress and press against the protrusions 48. The pressure against the protrusions 48 may force the movable surface 20 in a direction towards the cavity 14. The movable surface 20 may thus apply a force to a mobile device positioned within the cavity 14 to hold a variety of sizes of mobile device within the cavity 14. Although one movable surface is shown in FIG. 1, in other embodiments a different number of movable surfaces may be provided. For example, two side surfaces may be movable and biased towards the cavity such that a force is applied to the mobile device along the length of the mobile device and along the width. In one embodiment, three or four side surfaces may be movable and biased towards the cavity. In other embodiments, a greater number of side surfaces may be movable and biased towards the cavity. Further, in other embodiments, the shape and configuration of the movable surface may be varied from that shown in FIGS. 1 and 7.

Figure 9:
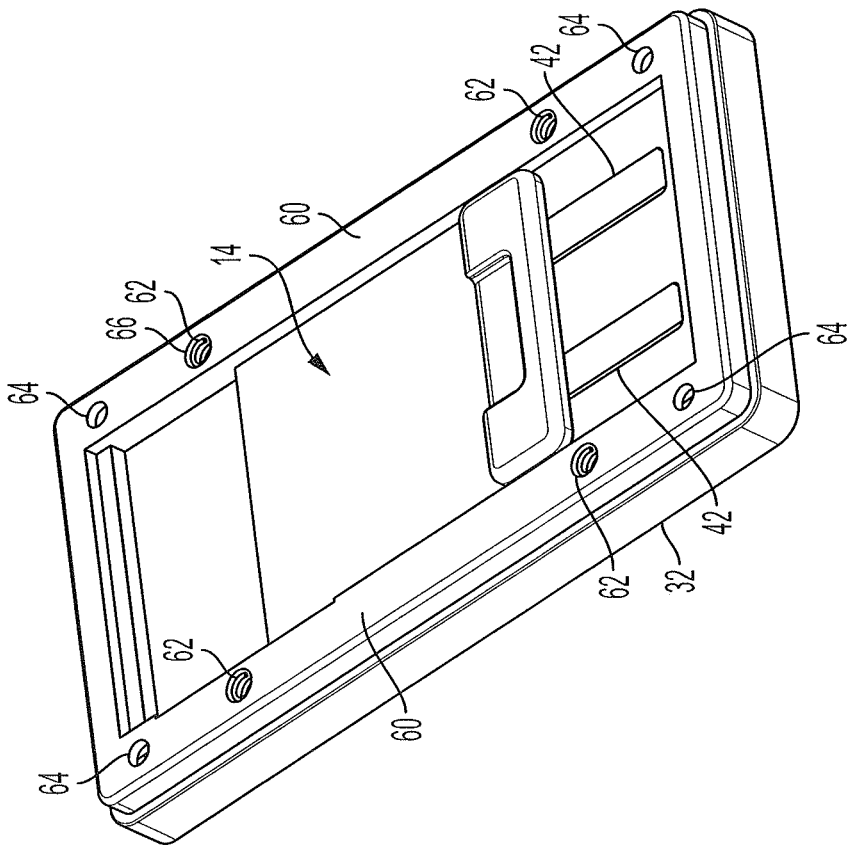
FIG. 9 illustrates a top perspective view of the frame shown in FIG. 1 without the top frame.

FIG. 9 illustrates the base 32 with the top frame 30 removed from the base 32. An upper surface 60 of the base 32 may include one or more guide holes 62 and securing holes 64. The guide holes 62 may be positioned in the upper surface 60 of the base 32 and may be spaced from each other around the periphery of the cavity 14. Each guide hole 62 may be configured to receive a spring 66 or other form of biasing device for biasing the top frame 30 (shown in FIG. 1) in a direction away from the base 32. Each guide hole 62 may be configured to receive a guide post 68 (marked in FIG. 10) of the top frame 30 that may slide within the respective guide hole 62. The securing holes 64 may be positioned in the upper surface 60 of the base 32 and may be spaced from each other around the periphery of the cavity 14. Each securing hole 64 may be configured to receive a securing post 70 of the top frame 30 that may securely couple to the securing hole 64 of the base 32, and may prevent the top frame 30 from separating from the base 32. As shown in FIG. 4, each securing hole 64 may extend through the surface of the base 32.

Figure 10:
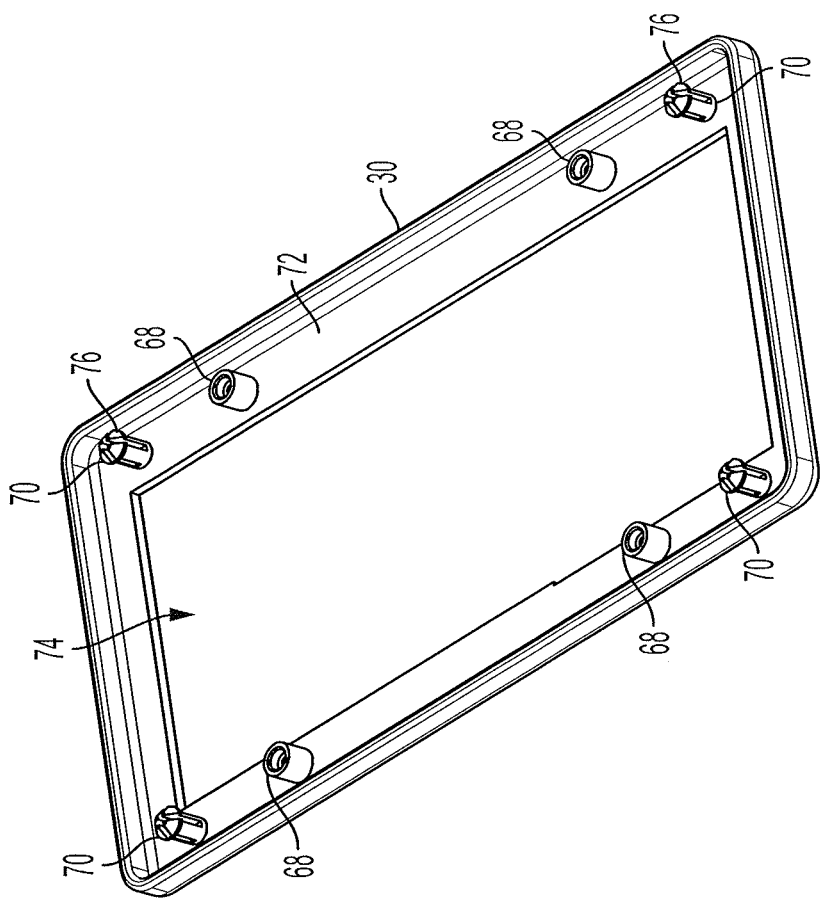
FIG. 10 illustrates a rear perspective view of the top frame shown in FIG. 1.

FIG. 10 illustrates a rear perspective view of the top frame 30 separated from the base 32. The back surface 72 of the top frame 30 is shown. The back surface 72 may include the guide posts 68 and securing posts 70 each spaced from each other around the periphery of a central opening 74 of the top frame 30. The guide posts 68 may be configured to slide within the guide holes 62 of the base 32 and be pressed by the springs 66 or other biasing devices within the guide holes 62. The securing posts 70 may be configured to slide within the securing holes 64 of the base 32 and may prevent the top frame 30 from separating from the base 32. For example, each securing post 70 may include an outwardly extending flange 76 that prevents the securing post 70 from separating from the respective securing hole 64. However, the securing post 70 may slide within the respective securing hole 64. In other embodiments, a configuration of guide holes, securing holes, guide posts, or securing posts may be varied from the configuration shown in FIGS. 9 and 10. For example, only one of such components may be utilized as desired. The position and configuration of such components may be varied as desired.

Figure 11:
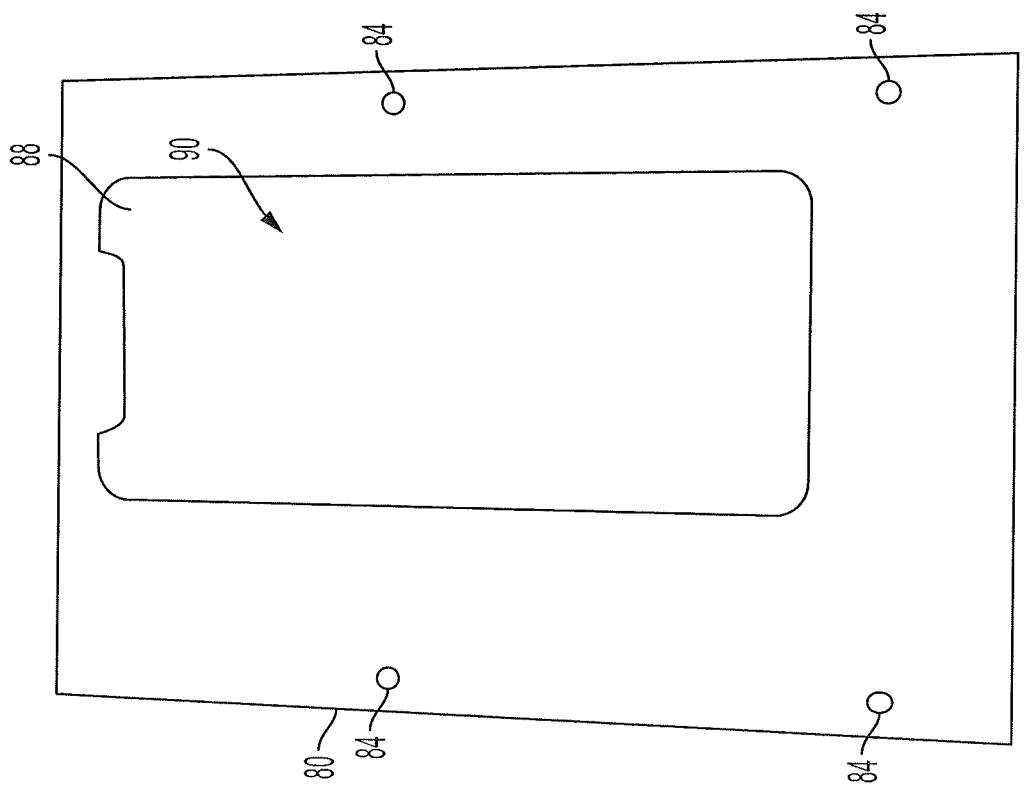
FIG. 11 illustrates a top view of an alignment layer according to an embodiment of the present disclosure.

Referring back to FIG. 1, a surface 78 of the top frame 30 positioned outside of the cavity 14 is provided. The surface 78 may comprise a top surface 78 of the top frame 30 and is configured for supporting an alignment layer 80 (for example, as shown in FIG. 11). The surface 78 may include one or more retainers 82 positioned about the periphery of the cavity 14 and spaced from each other. Each retainer 82 may be configured to couple to the alignment layer 80. As shown, the retainers 82 may comprise posts extending upward from the surface 78 of the top frame 30. However, in other embodiments, the retainers 82 may have different forms, for example, as clips, clamps, latches, or other forms of retainers. In one embodiment the number and position of the retainers 82 may be varied to be greater or less than the number shown in FIG. 1. The retainers 82 may be positioned on the surface 78 of the top frame 30 to align with alignment holes 84 of the alignment layer 80.

The top frame 30 may be configured to move relative to the base 32. The guide posts 68 and securing posts 70 that each couple the top frame 30 to the base 32 may be configured to slide relative to the base 32 to allow the entire top frame 30 to be depressed relative to the base 32. The springs 66 or other biasing devices present in the guide holes 62 may bias the top frame 30 in a direction away from the base 32. The securing posts 70 may prevent the top frame 30 from entirely separating from the base 32. The user may move the top frame 30 down relative to the base 32 to depress the surface 78 of the top frame 30 and the retainers 82 relative to the bottom surface 24 of the cavity 14 and relative to any mobile device that may be positioned within the cavity 14. The movement of the surface 78 may reduce a distance between a protective layer of an outer surface protector and the outer surface of the mobile device when the mobile device is positioned in the cavity. The surface 78 of the top frame 30 may be configured to be raised to raise the retainers 82 coupled thereto to pull the alignment layer upwards relative to the protective layer to release the alignment layer from the protective layer.

The top surface 78 shown in FIG. 1 is a unitary body. In other embodiments, the top surface 78 may comprise multiple portions that may be individually movable. In one embodiment, the surface 78 for supporting the alignment layer may not be a top surface, but may be an intermediate surface of the top frame 30. In one embodiment, the top surface 78 may not include any retainers, but may comprise a surface 78 for supporting the alignment layer via an adhesive coupling or other support of the alignment layer.

FIG. 11 illustrates a top view of an alignment layer 80 that may be utilized with the frame 12. The alignment layer 80 may comprise a layer of material that is used to align a protective layer 86 (marked in FIG. 17) over an outer surface of the mobile device to be protected. The alignment layer 80 may comprise a sheet of material and may have a rectangular shape, or other shape as desired. The alignment layer may include alignment holes 84 spaced from each other around the outer periphery of the alignment layer 80. Each alignment hole 84 may be configured to couple to a respective one of the retainers 82 of the top frame 30. The alignment holes 84 may be specifically positioned on the alignment layer 80 such that a correct alignment is provided when the alignment layer 80 is coupled to the top frame 30. For example, the alignment holes 84 and the retainers 82 may be positioned relative to each other such that the protective layer is not improperly rotated relative to the outer surface of the mobile device and is aligned upon the outer surface of the mobile device when the retainers 82 are coupled to the alignment holes 84. The position of the alignment holes 84 and the retainers 82 may be keyed to each other.

The alignment layer 80 may include a portion 88 for supporting the protective layer. The portion 88 may comprise a cut-out portion in the shape of the protective layer, or may have another configuration as desired. The portion 88 may be specifically cut according to the shape of the protective layer to be utilized such that the protective layer fits within the portion 88. The portion 88 may include an adhesive 90 along a surface of the portion 88 that couples the alignment layer 80 to the protective layer 86 (marked in FIG. 17).

Figure 12:
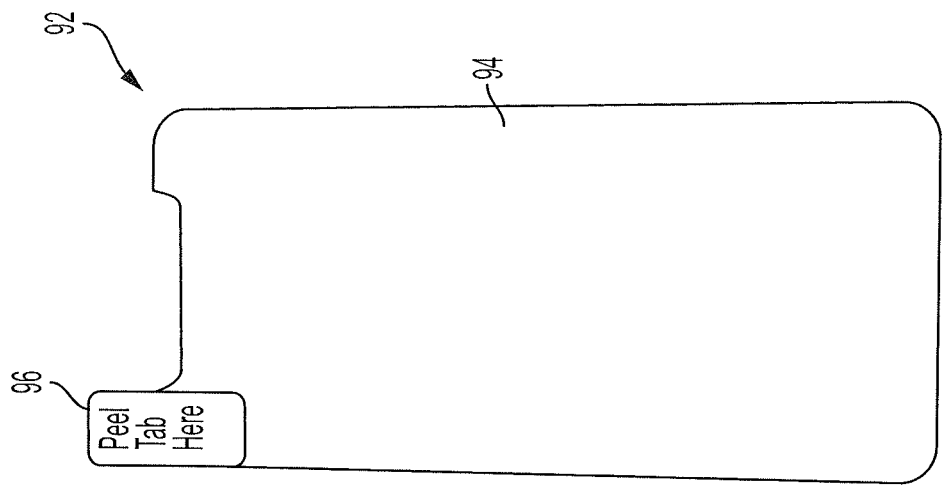
FIG. 12 illustrates a top view of an outer surface protector according to an embodiment of the present disclosure.

FIG. 12 illustrates a top view of an outer surface protector 92 that may be utilized in the system. The outer surface protector 92 may include a protective layer 86 (marked in FIG. 17) and a backing layer 94 (shown being pulled away from the protective layer 86 in FIG. 15) coupled to the protective layer 86. A tab 96 may be provided for a user to pull to separate the backing layer 94 from the protective layer 86. The protective layer 86 may be for the outer surface of the mobile device 98. The protective layer 86 may be sized to fit the outer surface of the mobile device to be protected (for example sized to fit the screen of the mobile device), or may have another size as desired. An adhesive may couple the protective layer to the backing layer.

The protective layer 86 may be made of a flexible plastic material, or in other embodiments may comprise a glass material (e.g., a sheet of thin glass), or other material as desired. The protective material 86 may be configured to protect the outer surface of the mobile device from external substances and impact as desired.

The outer surface protector 92 may be sized to fit within the cut-out portion 88 of the alignment layer 80. For example, the outer surface protector 92 may have an outer surface contour that matches the contour of the cut-out portion 88 of the alignment layer 80. The outer surface protector 92 accordingly may rest within the cut-out portion 88 of the alignment layer 80 and may lay upon a supporting surface of the alignment layer 80. The protective layer 86 accordingly may be sandwiched between the supporting surface of the alignment layer 80 and the backing layer 94.

Figure 13:
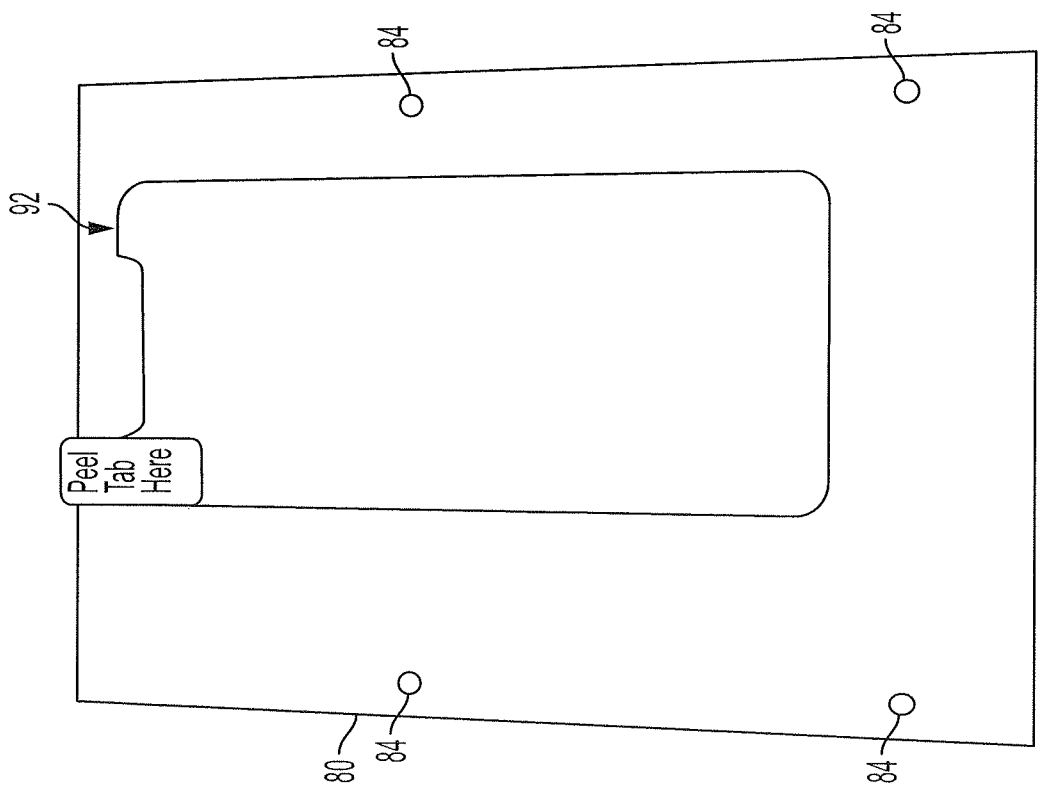
FIG. 13 illustrates the outer surface protector of FIG. 12 positioned within a cut-out portion of the alignment layer of FIG. 11.

FIG. 13 illustrates the outer surface protector 92 positioned within the cut-out portion 88 of the alignment layer 80.

FIGS. 14-20 illustrate a method that may be utilized to apply the protective layer 86 to an outer surface of a mobile device utilizing the systems herein.

Figure 14:
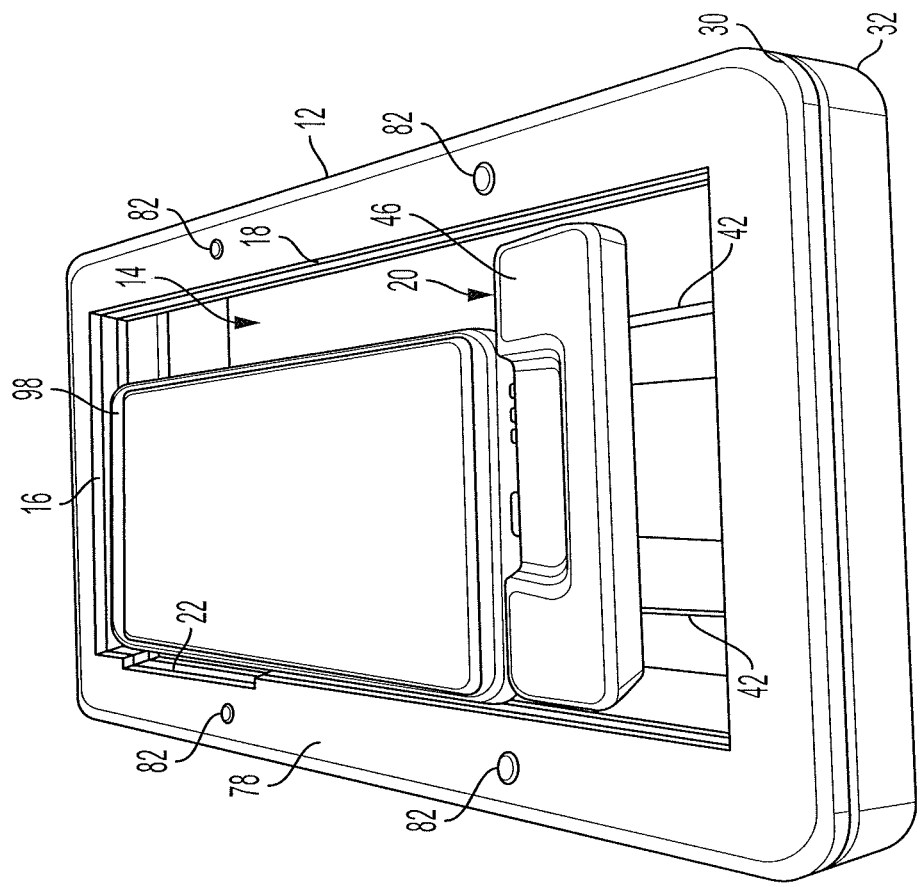
FIG. 14 illustrates a top perspective view of a mobile device positioned within the frame shown in FIG. 1.

FIG. 14 illustrates a perspective view of a mobile device 98 positioned within the cavity 14 of the frame 12. The mobile device 98 may comprise an Apple iPhone® as shown in FIG. 14 or may comprise any other form of mobile device. Such mobile devices often come in a variety of sizes or outer dimensions. As such, the movable surface 20 of the frame 12 is pulled away from the cavity 14 prior to the mobile device 98 being inserted into the cavity 14. The mobile device 98 is then inserted into the cavity 14 in a designated portion of the cavity 14 such as the upper left corner of the cavity 14. The mobile device 98 may abut the other side surfaces 16, 22 of the cavity 14. The movable surface 20 of the frame 12 is then moved towards the cavity 14, with the springs 50 (shown in FIG. 6) biasing the movable surface 20 towards the cavity 14. As such, the movable surface 20 holds the mobile device 98 within the cavity 14. In addition, a variety of sizes or outer dimensions of mobile devices may be accommodated. The size of the cavity 14 may be varied by moving the movable side surface 20 of the cavity 14. The frame 12 may be configured to accommodate multiple different sizes of mobile device, according to the different sizes that may be provided by one or more manufacturers. In an embodiment in which multiple side surfaces are movable, the multiple side surfaces may be moved to accommodate and hold the mobile device in position.

Figure 15:
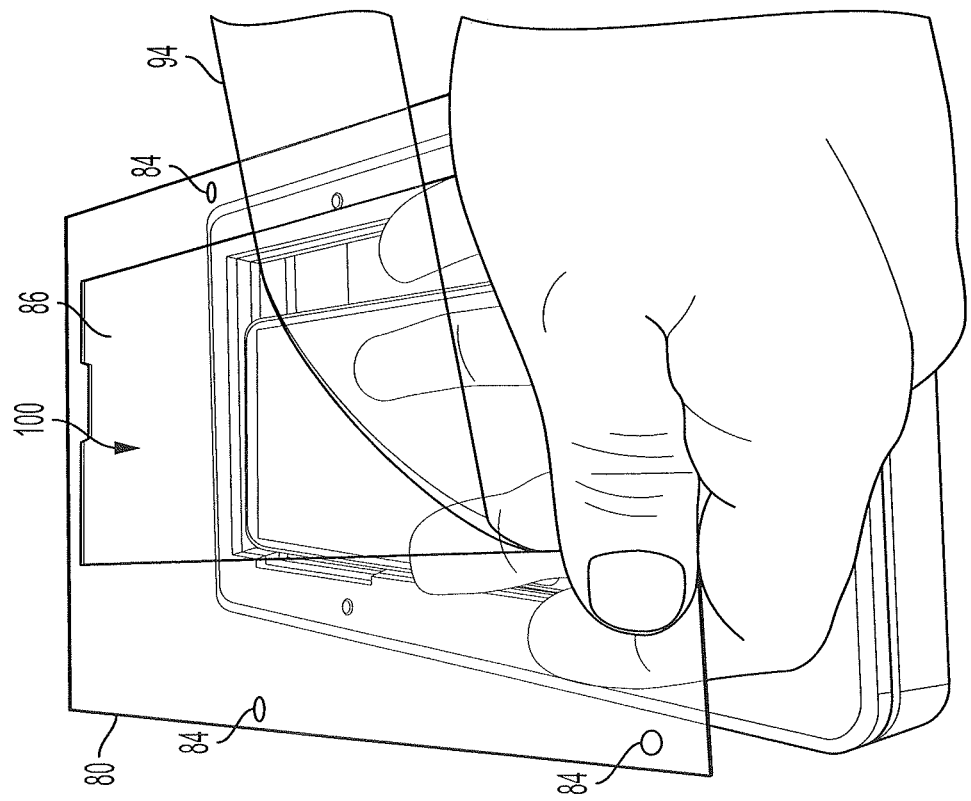
FIG. 15 illustrates a top perspective view of a portion of the outer surface protector of FIG. 13 being removed.

FIG. 15 illustrates the alignment layer 80 being provided with the outer surface protector. The outer surface protector is coupled to the alignment layer 80, with the backing layer 94 of the outer surface protector being removed by hand by the user. The protective layer 86 remains coupled to the alignment layer 80, with an adhesive 100 of the protective layer 86 being exposed by the backing layer 94 being removed. The protective layer 86 may be sized to fit the outer surface of the mobile device 98 to be protected. The protective layer 86 may be positioned on the alignment layer 80 based on the mobile device to be protected. For example, a user may select the desired alignment layer 80 and protective layer 86 based on the type of mobile device to be protected. The size and outer dimensions of the protective layer 86, and the position of the protective layer 86 on the alignment layer 80, may be selected according to the size of mobile device to be protected. For example, if a larger sized mobile device is to be protected, then a correspondingly larger size of protective layer 86 may be utilized. If a certain mobile device includes a feature (such as a camera) that should not be protected by the protective layer, then the protective layer may include a cut-out to avoid such feature. The user may have a variety of different types of protective layers 86 and alignment layers 80 to select from based on the type of mobile device to be protected.

Figure 16:
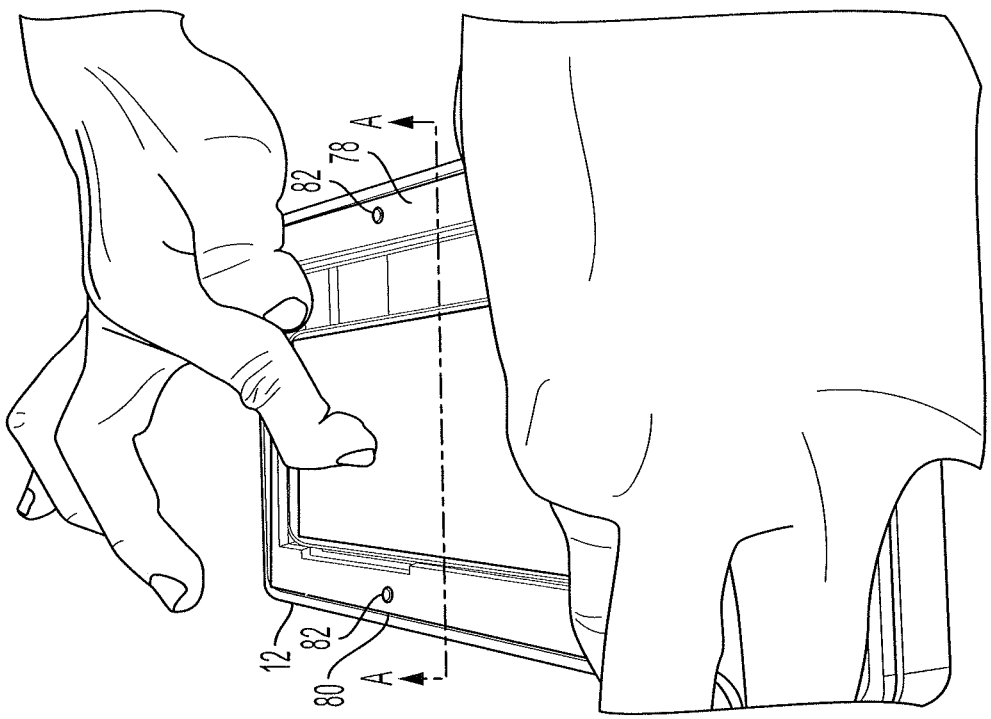
FIG. 16 illustrates a top perspective view of a protective layer being applied to the mobile device.

FIG. 16 illustrates the alignment layer 80 and protective layer 86 being flipped from the position shown in FIG. 15. The alignment layer 80 is supported with the surface 78 positioned outside of the cavity 14. The alignment holes 84 of the alignment layer 80 may be coupled to the retainers 82 of the top frame and may align the protective layer 86 in the proper position over the outer surface of the mobile device 98 to be protected. The alignment between the alignment holes 84 and the retainers 82 may prevent the protective layer 86 from being undesirably or improperly rotated relative to the outer surface of the mobile device to be protected.

Figure 17:
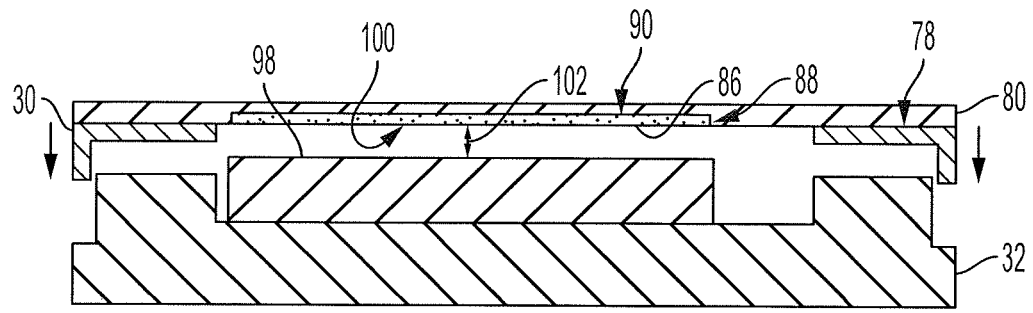
FIG. 17 illustrates a cross sectional view along line A-A in FIG. 16.
Figure 18:
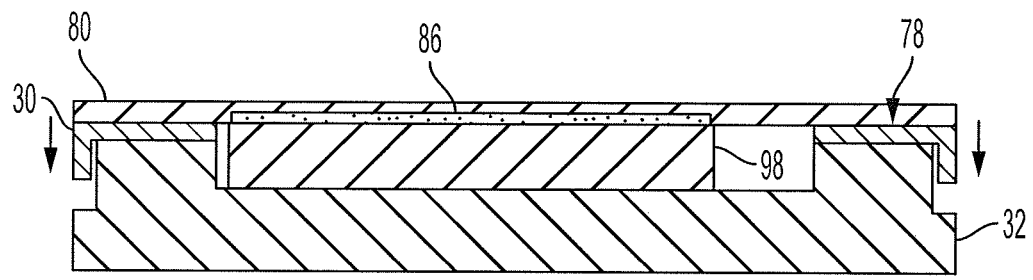
FIG. 18 illustrates a cross sectional view along line A-A in FIG. 16.

In FIG. 16, upon the alignment layer 80 being aligned upon the surface 78 of the top frame 30, the user may depress the surface 78 relative to the mobile device 98 to move the protective layer 86 towards the outer surface of the mobile device. The protective layer 86 is positioned between the alignment layer 80 and the outer surface of the mobile device when the surface 78 positioned outside the cavity is depressed relative to the mobile device to move the protective layer 86 towards the outer surface of the mobile device. FIG. 17, for example, illustrates a cross sectional view along line A-A in FIG. 16 of the protective layer 86 coupled to the alignment layer 80, with the alignment layer supported by the surface 78 of the top frame 30, prior to the user depressing the surface 78. FIG. 18 illustrates the motion of the surface 78 upon being depressed. The movement of the surface 78 may reduce a distance 102 (marked in FIG. 17) between the protective layer 86 and the outer surface of the mobile device 98 to be protected when the mobile device 98 is positioned in the cavity 14. As such, the protective layer 86 may contact the outer surface of the mobile device 98 as shown in FIG. 18, to apply the protective layer 86 to the outer surface, or may enhance the ease by which a user may further press down on the protective layer 86 to apply the protective layer 86 to the outer surface of the mobile device 97 to be protected.

Referring back to FIG. 16, with the surface 78 of the top frame 30 depressed, the user may further press upon the alignment layer 80 to apply the protective layer 86 down onto the outer surface of the mobile device 98 to be protected, and to smooth out any bubbles that may be present between the protective layer 86 and the outer surface of the mobile device 98. For example, the user may swipe with a finger along the protective layer 86 to spread the adhesive 100.

Figure 19:
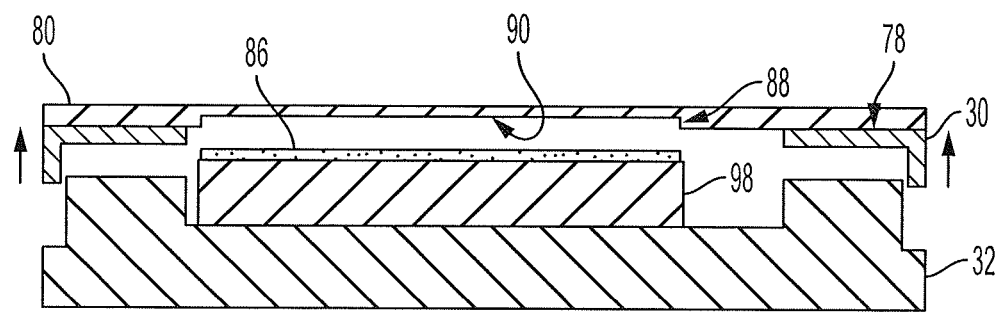
FIG. 19 illustrates a cross sectional view along line A-A in FIG. 16.

The alignment layer 80 may then be separated from the protective layer 86. FIG. 19 illustrates a process for removing the alignment layer 80 in which the surface 78 of the top frame is released to move upward. The surface 78 may be raised relative to the mobile device 98 to release the alignment layer 80 from the protective layer 86. The springs 66 or other biasing devices may press the top frame 30 upward. The retainers 82 may pull on the alignment layer 80 when the top frame 30 is released, such that the adhesive 90 separates from the protective layer 86. The adhesive 90 of the alignment layer 80 may not be as strong as the adhesive 100 of the protective layer 86, such that the protective layer 86 remains coupled to the outer surface of the mobile device. The adhesive 90 may be configured to release when the alignment layer 80 is pulled upward and away from the protective layer 86. The adhesive 100 may couple the protective layer 86 to the outer surface of the mobile device more strongly than the adhesive 90 couples the alignment layer 80 to the protective layer 86.

The surface 78 of the top frame 30 and the retainers 82 accordingly may be configured to move from a raised configuration as shown for example in FIG. 17 to a depressed or lowered configuration as shown for example in FIG. 18, and back to a raised configuration as shown for example in FIG. 19. The surface 78 of the top frame 30 and the retainers 82 accordingly may be biased towards the raised configuration. The one or more springs 66 may bias the surface 78 of the top frame 30 and the retainers 82 towards the raised configuration.

Figure 20:
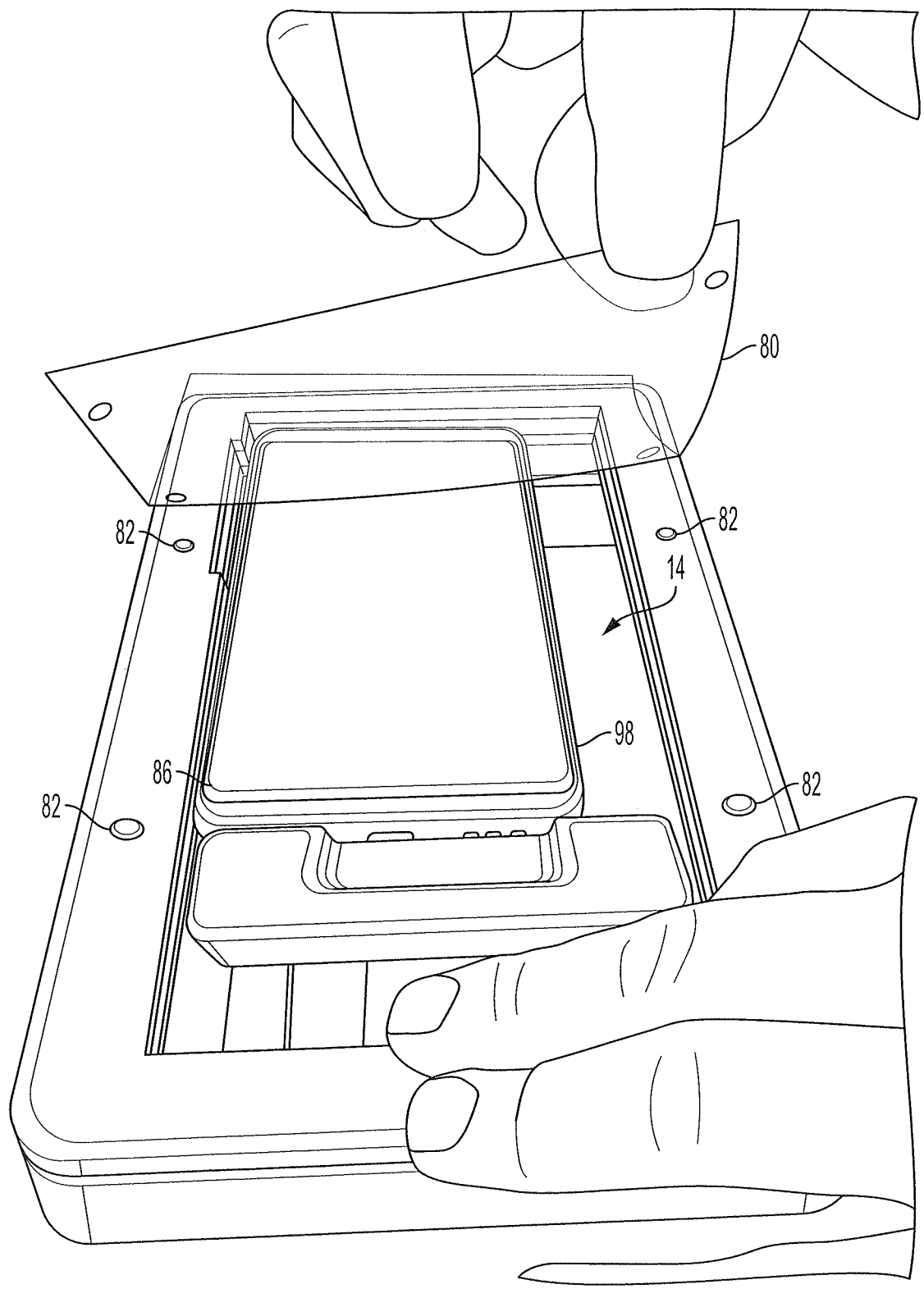
FIG. 20 illustrates a top perspective view of an alignment layer being removed from the frame shown in FIG. 1.

As shown in FIG. 20, the user may pull the alignment layer 80 off of the retainers 82 to leave the protective layer 86 coupled to the mobile device 98 and discard the alignment layer 80.

The user may then remove the mobile device 98 from the cavity 14, with the protective layer 86 coupled to the mobile device 98.

The system may beneficially allow for various sizes of mobile device to be received by the frame 12. Various sizes of protective layers may be applied to the mobile device. An improved and efficient application of the protective layer and removal of the alignment layer from the protective layer may be provided.

Although a screen of the mobile device is shown to be protected with the methods of FIGS. 14-20, in other embodiments a non-screen surface may be protected in a similar manner, by performing the method to the opposite side of the mobile device than shown in FIG. 14 for example.

Figure 21:
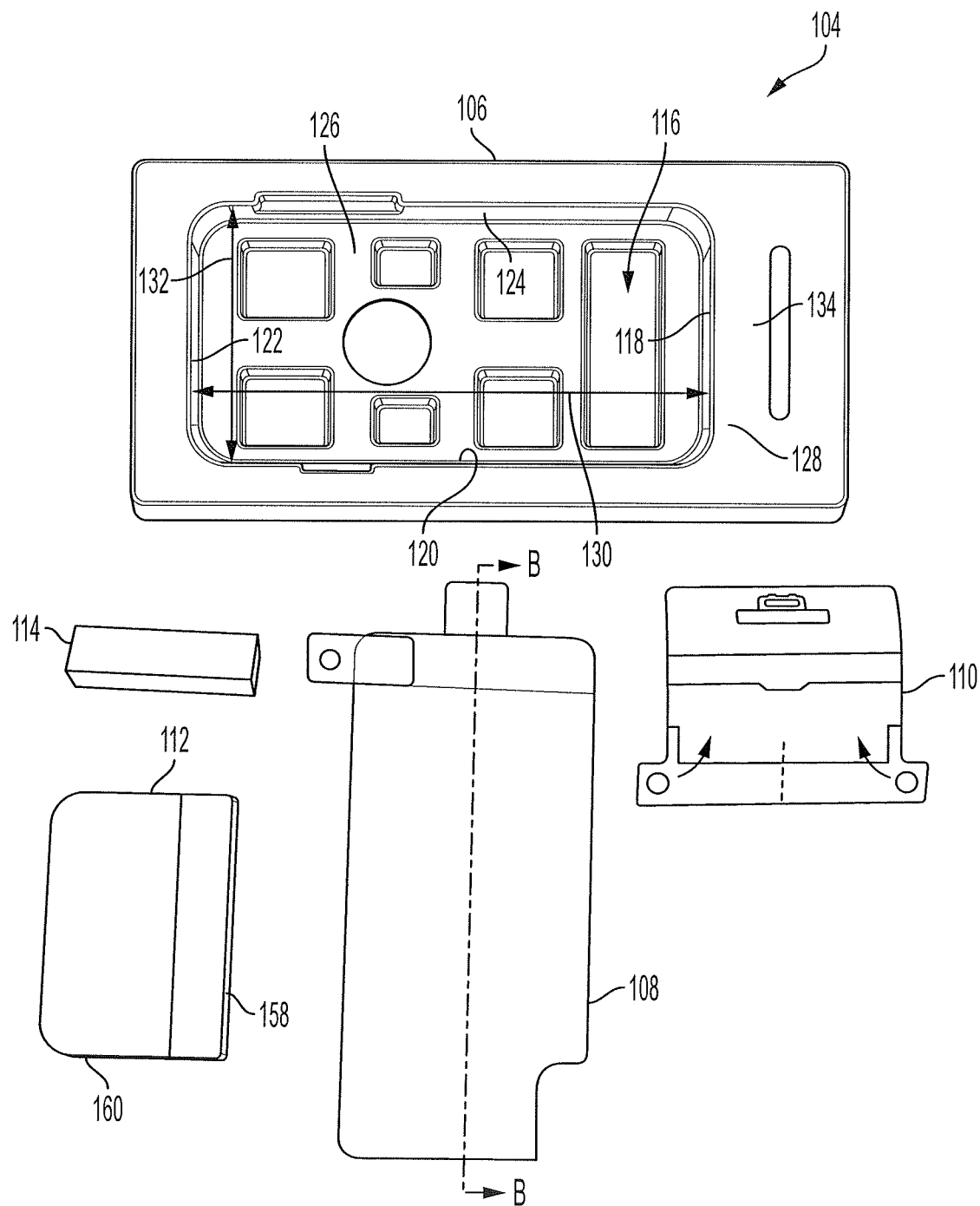
FIG. 21 illustrates a top perspective view of components for use in a system for applying a protective layer to an outer surface of a mobile device.

FIG. 21 illustrates components for use in a system 104 for applying a protective layer to an outer surface of a mobile device.

The components may include a frame 106 for receiving the mobile device, an outer surface protector 108 for the mobile device, a tab 110 for coupling the outer surface protector 108 to the frame 106, an applicator device 112, and a wedge 114.

The frame 106 may define a cavity 116 configured to receive the mobile device, and may include a plurality of side surfaces 118, 120, 122, 124 surrounding the cavity 116. As shown in FIG. 21, the side surfaces 118, 120, 122, 124 may be static relative to the cavity 116, or similar to the embodiment of the frame 12 shown in FIG. 1, one or more side surfaces may be movable to vary a size of the cavity 116. The frame 106 may include a bottom surface 126 for defining a bottom of the cavity 116.

The body of the frame 106 apparatus may include an upper surface 128 positioned exterior of the cavity 116. The upper surface 128 may be positioned at an upper extent of the cavity 116 and may extend outward from the cavity 116. In one embodiment, the cavity 116 may be sized such that the upper surface 128 is substantially flush with the outer surface of the mobile device.

The cavity 116 may be configured to have a length 130 and a width 132. The upper surface 128 may be configured to surround the cavity 116 and be positioned along the length 130 and along the width 132 of the cavity 116. A portion 134 of the upper surface 128 may be positioned at one end of the length 130 of the cavity 116 (along the width 132), and may be configured to couple with the tab 110.

Figure 22:
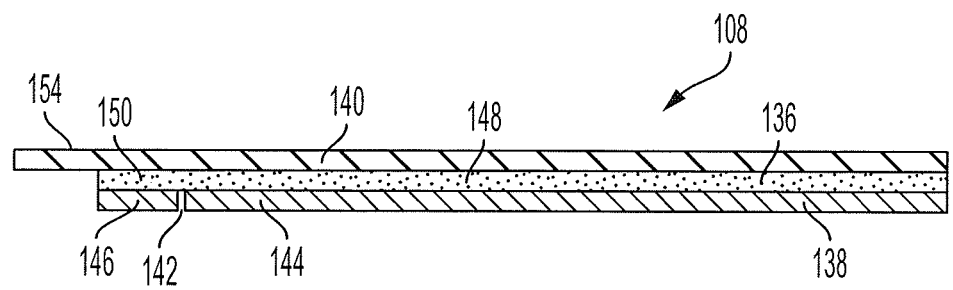
FIG. 22 illustrates a cross sectional view along line B-B in FIG. 21.

The outer surface protector 108 may configured to couple to the frame 106 and may include a protective layer for coupling to an outer surface of mobile device and may include a backing layer. FIG. 22 illustrates a side cross sectional view along the length of the outer surface protector 108 along line B-B in FIG. 21. The layers of the outer surface protector 108 are shown in FIG. 22. The layers may include the protective layer 136 for the outer surface of the mobile device 162 and the backing layer 138. The layers may also include a cover layer 140. The protective layer 136 may be sandwiched between the cover layer 140 and the backing layer 138. An adhesive on the protective layer 136 may couple the protective layer 136 to the backing layer 138. An adhesive on the cover layer 140 may couple the cover layer 140 to the protective layer 136. The cover layer 140 is positioned on an opposing side of the protective layer 136 relative to the backing layer 138.

The protective layer 136 may be made of a flexible plastic material, or in other embodiments may comprise a glass material (e.g., a sheet of thin glass), or other material as desired. The protective material 136 may be configured to protect the outer surface of the mobile device from external substances and impact as desired.

Figure 24:
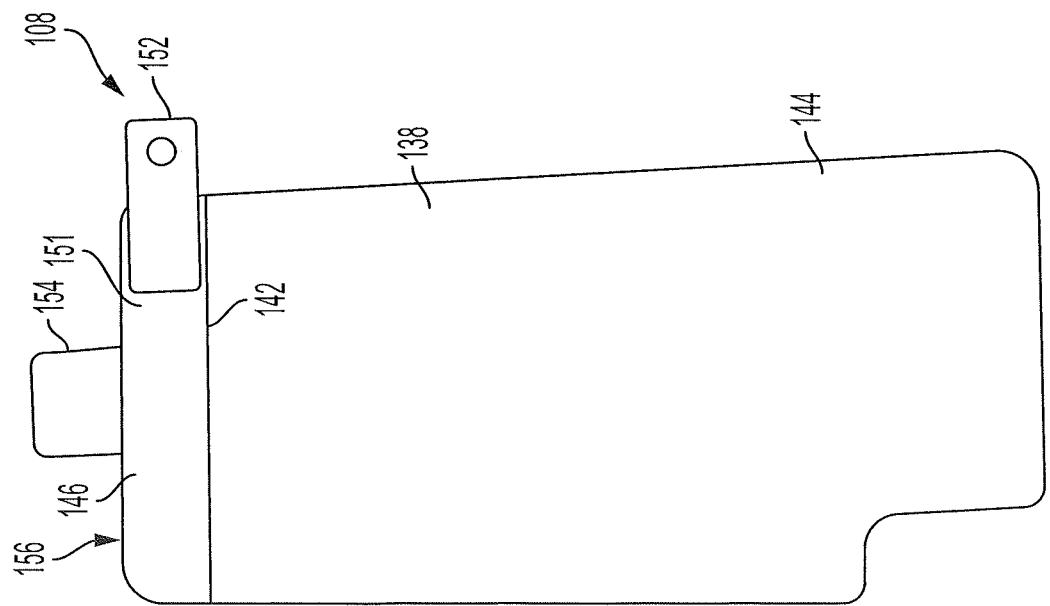
FIG. 24 illustrates a bottom view of the outer surface protector shown in FIG. 21.

The backing layer 138 may be divided into one or more portions. As shown in FIGS. 22 and 24, the backing layer 138 may include one or more cuts 142 that separate the backing layer 138 into at least two portions 144, 146. The one or more cuts 142 may form a cut line that passes continuously through the entire backing layer 138, or may form perforations in the backing layer 138. One or more cuts 142 may be configured such that each portion 144, 146 of the backing layer 138 may be selectively separated from the protective layer 136 to expose a respective portion 144, 146 of the protective layer 136. For example, a first portion 144 of the backing layer 138 may be separated to expose a first portion 148 of a protective layer 136. A second portion 146 of the backing layer 138 may be separated to expose a second portion 150 of the protective layer 136.

As shown in FIG. 24, the one or more cuts 142 may extend along a width of the outer surface protector 108. The one or more cuts 142 may extend transverse to the length of the outer surface protector and may extend perpendicular to the length. The one or more cuts 142 may be configured to faun a strip 151 of backing layer 138 material (marked in FIG. 24) that may be pulled along the width of the protector 108 to separate from the protective layer 136. The strip 151 of material may be adjacent an upper edge 156 of the backing layer 138. The other portion (or first portion 144) may be pulled along the length of the protector 108 to separate from the protective layer 136. As shown in FIG. 24, a tab 152 may be coupled to the second portion 146 of the backing layer 138 to allow for ease of removal from the protective layer 136 by being pulled in a direction transverse to the length of the outer surface protector 108 and the length of the cavity 116.

The second portion 146 (or strip 151) of the backing layer 138 may be sized smaller than the first portion 144 of the backing layer 138. The second portion 146 may be configured to be proximate the portion 134 of the frame 106 that the outer surface protector 108 couples to, and the first portion 144 may be distal to the portion 134 of the frame 106 that the outer surface protector 108 couples to. The second portion 146 may be adjacent to the portion 134 of the frame 106 that the outer surface protector 108 couples to. In other embodiments, the size and configuration of the one or more cuts 142 and the backing layer 138 may be varied as desired.

Figure 25:
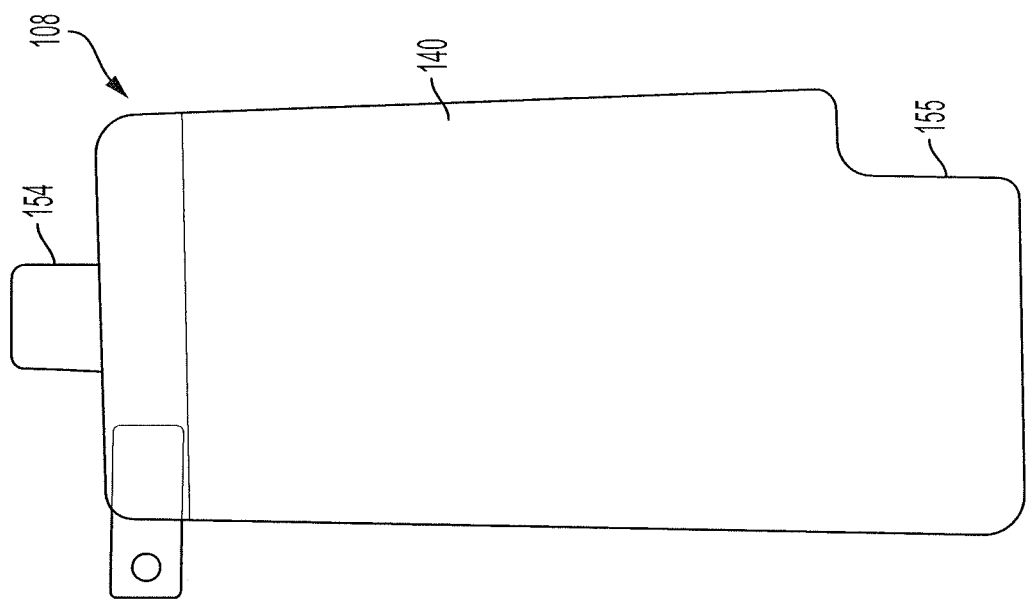
FIG. 25 illustrates a top view of the outer surface protector shown in FIG. 21.

FIG. 25 illustrates a top view of the outer surface protector 108. The cover layer 140 may include a tab 154 that may extend outward from the outer periphery of the protective layer 136. The tab 154 may be configured to a user to grip for removal of the cover layer 140 from the protective layer 136. The outer surface protector 108, and particularly the protective layer may include a cut-out portion 155 to avoid a feature of the outer surface of the mobile device such as a camera or other feature.

Referring back to FIG. 21, the wedge 114 may couple to the backing layer 138. The wedge 114 may couple to the first portion 144 of the backing layer 138 adjacent the one or more cuts 142. The wedge 114 may couple to the backing layer 138 with an adhesive and may extend along the width of the backing layer 138. The wedge 114 may be separated from the upper edge 156 (marked in FIG. 24) of the backing layer 138 by the second portion 146 of the backing layer 138.

The tab 110 may couple to the cover layer 140 of the outer surface protector 108 such that the protective layer 136 is sandwiched between the tab 110 and the backing layer 138. The cover layer 140 is also sandwiched between the backing layer 138 and the tab 110. A first end portion of the tab 110 may couple to the frame 106, particularly to the receiving portion 134 of the frame 106. The second end portion of the tab 110 may couple to the outer surface protector 108. The tab 110 may couple to the outer surface protector 108 and the frame 106 with an adhesive, or a connector may be provided for a more secure coupling. For example, a protrusion of the tab 110 may fit into an opening on the receiving portion 134 of the frame 106.

The applicator device 112 may be configured to be pressed against the outer surface protector 108 and the wedge 114 to separate the backing layer 138 from the protective layer 136 and apply the protective layer 136 to the outer surface of the mobile device. The applicator device 112 may comprise a wiper, such as a squeegee wiper, or may comprise a roller, with a roller device to press against the wedge 114. In other embodiments, other forms of applicator devices 112 may be utilized. The applicator device 112 may include an applicator portion 158 and a grip portion 160 for a user to grip.

Figure 26:
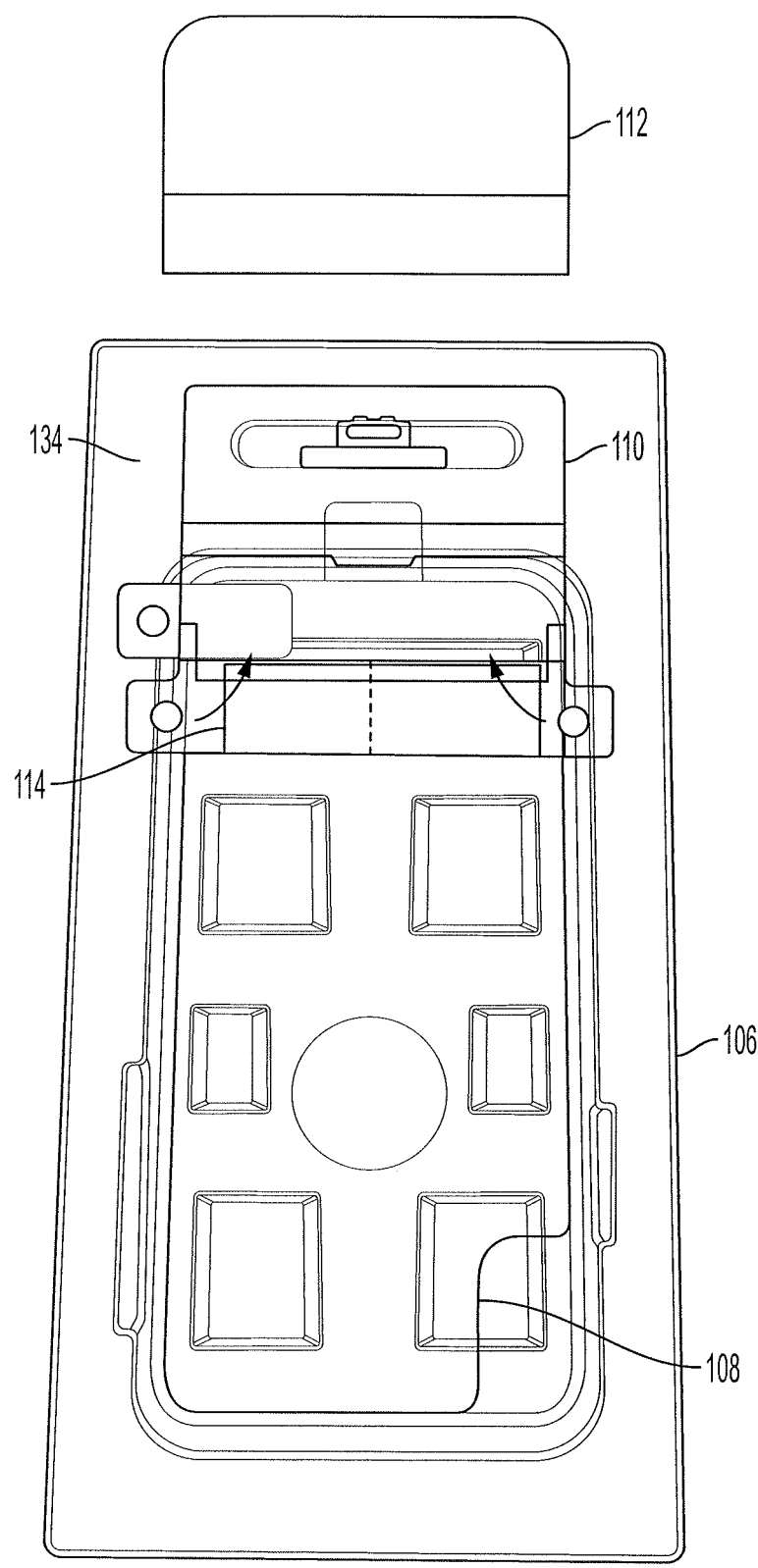
FIG. 26 illustrates a top perspective view of the components of the system of FIG. 21 assembled.

FIG. 26 illustrates components of system assembled. The tab 110 is shown coupled to the receiving portion 134 of the frame 106. A portion of the tab 110 is coupled to the frame 106 and a portion of the tab 110 is coupled to the outer surface protector 108. The tab 110 extending over the tab 152 and having a distal section, the distal section having a width greater than a width of the cavity 116 and defining a flap, the flap not overlapping with the tab 152 and configured to separate the tab 110 from the outer surface protector when pulled. The protective layer 136 (marked in FIG. 22) is sandwiched between the tab 110 and the backing layer 138.

The cover layer 140 is sandwiched between the tab 110 and the backing layer 138, as well as the protective layer 136. The wedge 114 is coupled to the backing layer 138. The length of the outer surface protector 108 extends along the length of the cavity 114. The outer surface protector 108 is configured to couple to an adjacent surface of the frame 106 such that the backing layer 138 is positioned between the outer surface of the mobile device and the protective layer 136 when the mobile device is positioned in the cavity.

FIGS. 27-32 illustrate a method that may be utilized to apply the protective layer 136 to an outer surface of a mobile device utilizing the systems herein.

In FIG. 27, a mobile device 162 may be positioned in the cavity of the frame 106. As shown in FIG. 27, the mobile device 162 may be positioned in the frame 106 facing downward, with the non-screen surface of the mobile device 162 facing upward. The outer surface protector 108 is shown coupled to the frame 106 but flipped backwards to allow the mobile device 162 to be positioned within the cavity.

In FIG. 28, the outer surface protector 108 is flipped forward over the mobile device 162. The wedge 114 contacts the outer surface of the mobile device 162. The user may apply the protective layer 136 to the outer surface of the mobile device 162 by moving the applicator device 112 in a direction from a first end surface 164 of the frame 106 towards the second end surface 166, along the length of the cavity. The user may first slide the applicator device 112 along the tab 110 and apply force to the wedge 114.

As the applicator device 112 is pressed against the wedge 114, the layers of material between the wedge 114 and the upper edge 156 of the outer surface protector 108 may serve to reduce the flexibility of the outer surface protector 108 and more easily allow the applicator device 112 to apply a force to the wedge 114 that flips the direction of the wedge 114 and allows the first portion 144 of the backing layer 138 to separate from the first portion 148 of the protective layer 136. The applicator device 112 is pressed towards the wedge 114 in a direction toward a second end surface 166 of the frame 106. As the applicator device 112 continues to slide along the length of the outer surface protector 108, the first portion 144 of the backing layer 138 may be entirely separated from the first portion 148 of the protective layer 136. In addition, as the applicator device 112 is being slid, the first portion 148 of the protective layer 136 is pressed against the outer surface of the mobile device and applied.

Figure 23:
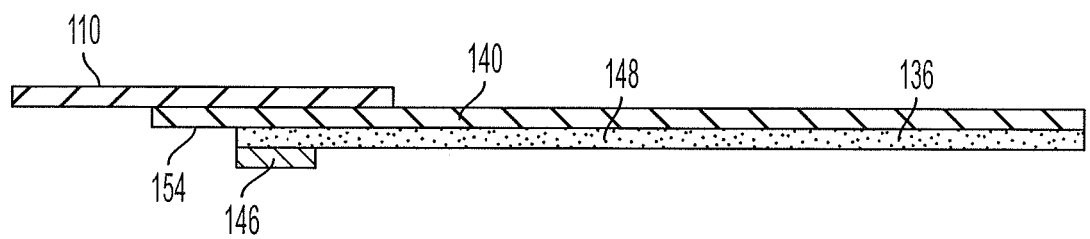
FIG. 23 illustrates a cross sectional view along line B-B in FIG. 21.
Figure 29:
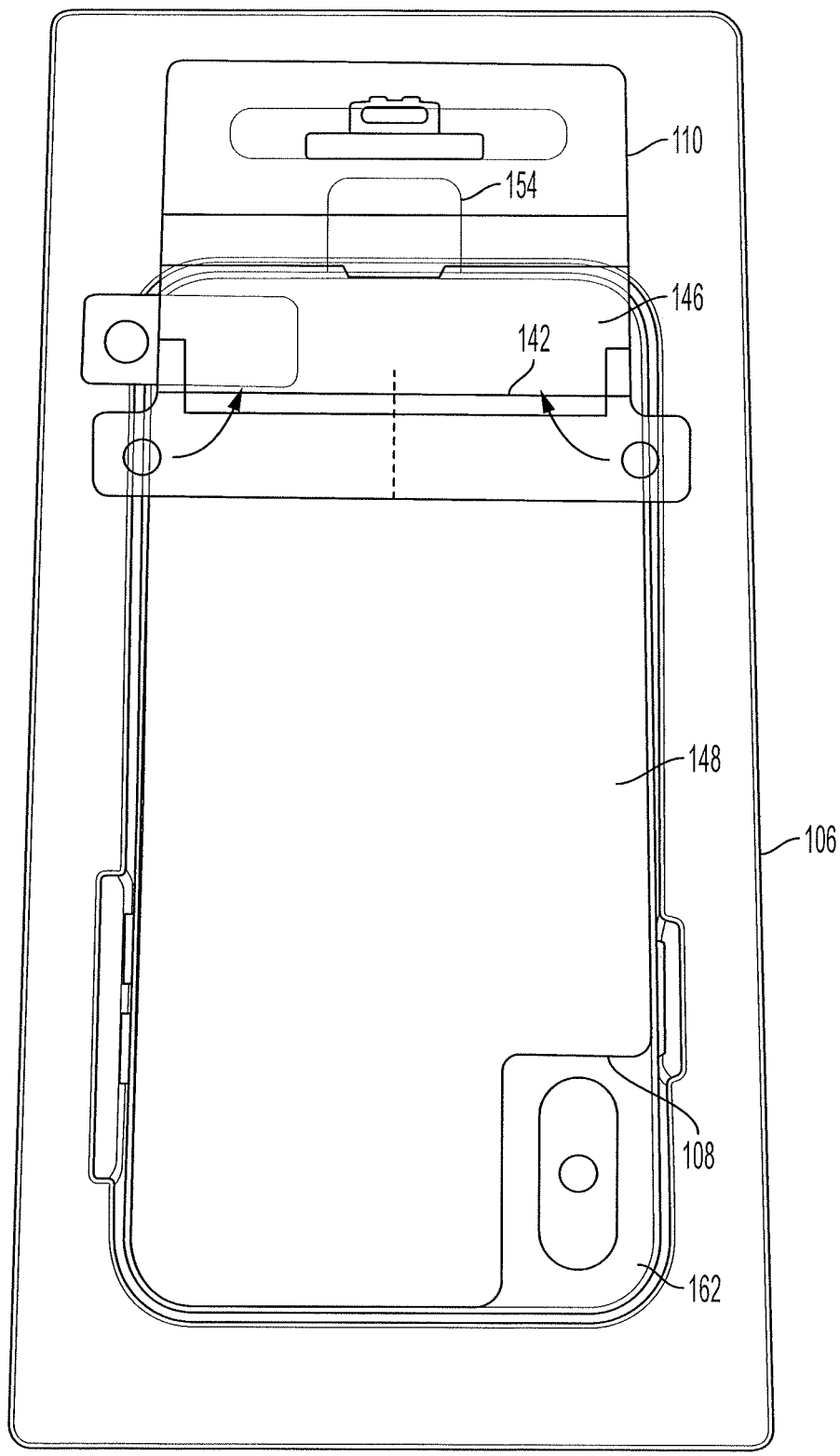
FIG. 29 illustrates a top view of a portion of an outer surface protector applied to an outer surface of a mobile device.

FIG. 29 illustrates the wedge 114 and first portion 144 of the backing layer 138 having been separated from the protective layer 136. The first portion 148 of the protective layer 136 is applied to the outer surface of the mobile device 162. An adhesive of the protective layer 136 may couple the protective layer to the outer surface of the mobile device 162. The tab 110 remains coupled to the frame 106 and to the cover layer 140. The second portion 146 of the backing layer 138 remains coupled to the protective layer 136 and sandwiched between the second portion 150 of the protective layer 136 and the outer surface of the mobile device 162. FIG. 23 illustrates a representative cross sectional view of the configuration of the layers of the outer surface protector 108 and the tab 110, along a mid line such as line B-B in FIG. 21. The first portion 144 of the backing layer 138 is shown removed from the first portion 148 of the protective layer 136.

With the first portion 148 of the protective layer 136 applied to the outer surface of the mobile device 162, the user may separate the tab 110 from the cover layer 140.

Figure 30:
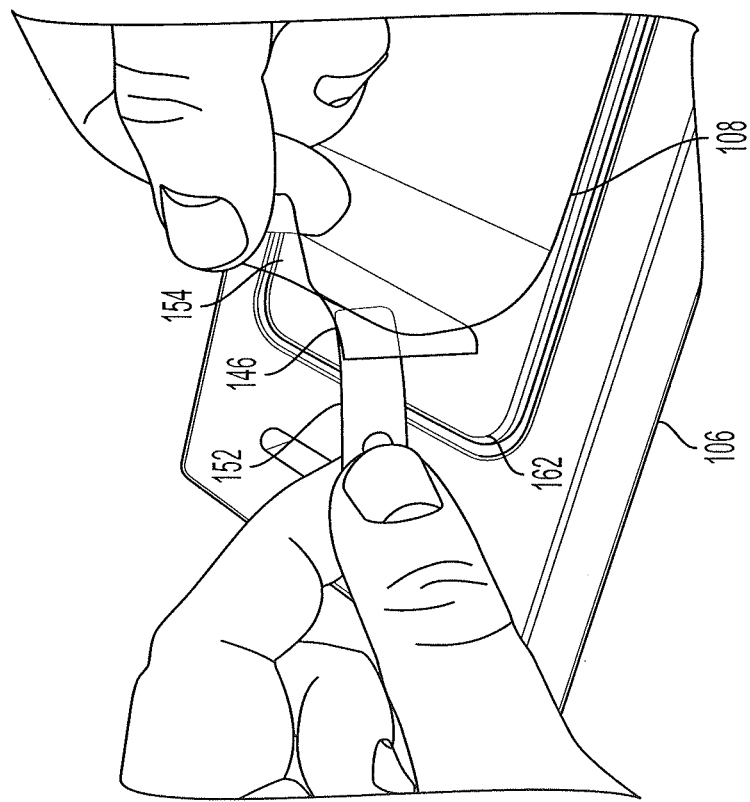
FIG. 30 illustrates a side perspective view of a portion of a backing layer being removed from a protective layer.

The user may then separate the second portion 146 of the backing layer 138 from the protective layer 136. FIG. 30 illustrates the second portion 146 of the backing layer 138 being removed to expose the second portion 150 of the protective layer 136. The user may lift the cover tab 154 to raise the outer surface protector 108 and lift the second portion 146 of the backing layer 138 away from the mobile device 162. The user may pull the tab 152 to remove the second portion 146 of the backing layer 138 from the protective layer 136. The second portion 146 of the backing layer 138 may be peeled from the protective layer 136 in a direction transverse to the length of the cavity 116 and transverse to the length of the outer surface protector 108. The user may then apply the second portion 150 of the protective layer 136 to the outer surface of the mobile device 162.

Figure 31:
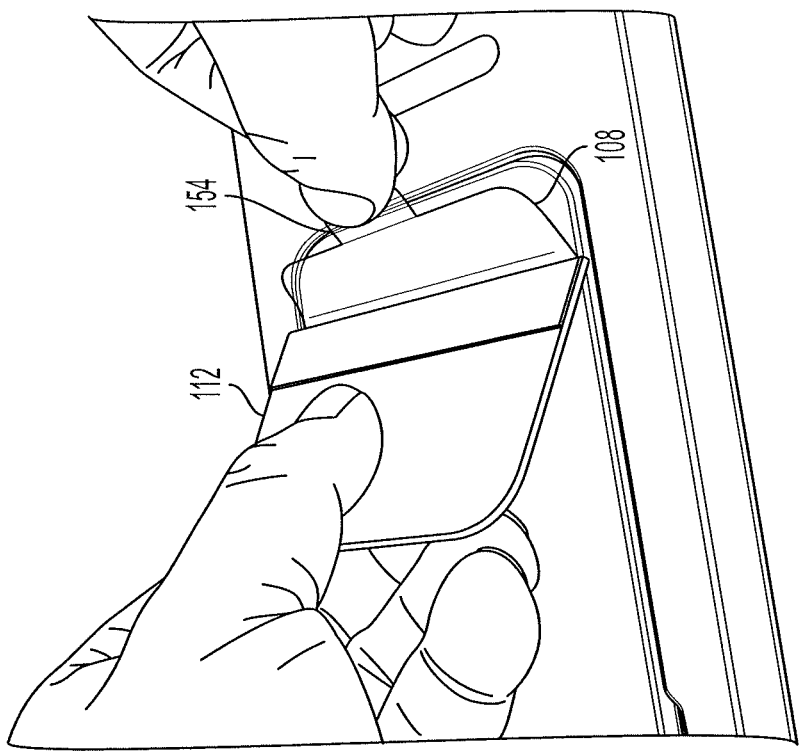
FIG. 31 illustrates a side perspective view of a portion of a protective layer being applied to an outer surface of a mobile device.

FIG. 31 illustrates the second portion 150 of the protective layer 136 being applied to the outer surface of the mobile device 162. The user may slide the applicator device 112 against the outer surface protector 108, while holding the tab 154 to apply the second portion 150 of the protective layer 136. An adhesive of the protective layer 136 may couple the protective layer to the outer surface of the mobile device 162. The user may also slide the applicator device 112 against the entirety of the outer surface protector 108 to smooth out any bubbles between the protective layer 136 and the outer surface of the mobile device 162.

Figure 32:
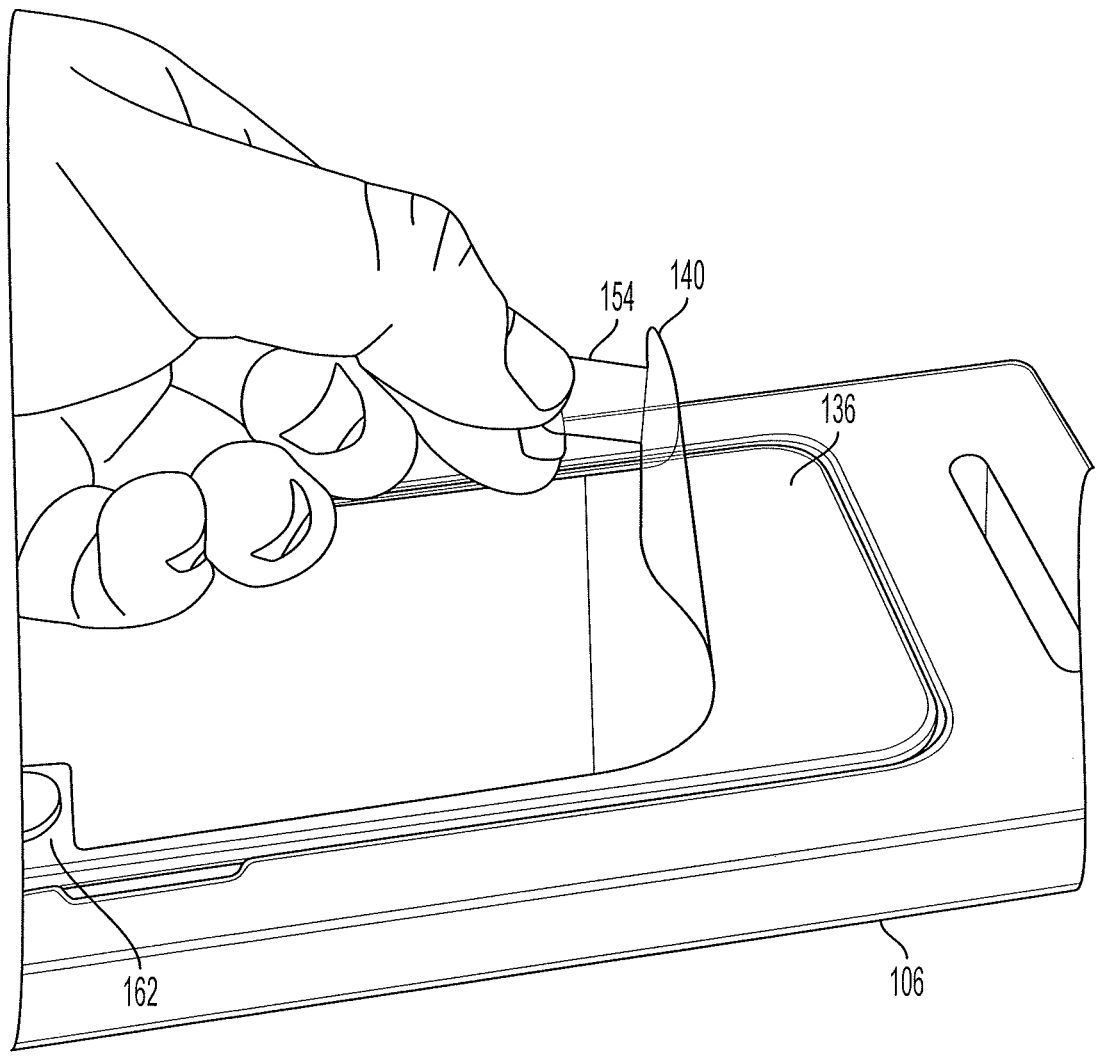
FIG. 32 illustrates a side perspective view of a cover layer being removed from a protective layer.

The user may then remove the cover layer 140 from the protective layer 136. As shown in FIG. 32, the user may pull the tab 154 to separate the cover layer 140 from the protective layer 136, with the protective layer 136 remaining coupled to the outer surface of the mobile device 162.

The methods as shown in FIGS. 27-32 may be utilized to apply the protective layer 136 to a non-screen surface (or back surface) of the mobile device as shown in FIGS. 27-32. In other embodiments, the methods may be utilized to apply the protective layer to a screen surface of the mobile device.

The one or more cuts 142 may beneficially allow for ease of application of the protective layer to the outer surface of the mobile device. For example, the location of the cuts may allow the wedge to be positioned further from the pivot point formed by the connection of the tab to the frame and the outer surface protector, such that stiffer material between the wedge 114 and the upper edge 156 of the outer surface protector 108 reduces the flexibility of the outer surface protector 108 and more easily allows the applicator device 112 to apply a force to the wedge 114. In addition, the location of the second portion 146 of the backing layer 138 may reduce the possibility of pulling an adhered protective layer from the outer surface of the screen when removing the tab 110 (if the second portion 146 of the backing layer 138 were not present).

The shapes and sizes of the frames 12, 106 and cavities 14, 116 may be varied as desired. For example, the frames may have a rectangular shape as shown, or may have any other shape (e.g., round, triangular, etc.) as desired. Similarly, the cavities may have any other shape (e.g., round, triangular, etc.) and may be sized according to the mobile device to be protected.

The systems disclosed herein may be utilized for home or personal application of protective layers to the mobile devices. In other embodiments, the systems disclosed herein may be utilized in a commercial setting, such as a store. For example, the frames 12, 106 may be for multiple uses, while the outer surface protectors may be for single use, and utilized by a store associate or the like to apply the protective layers in-store. A user may purchase a mobile device and the store associate or other user may select and apply the outer surface protector according to the type of mobile device purchased. The store associate or other user may apply the protective layer to a screen or non-screen surface of the mobile device as desired.

Features of the components disclosed herein may be modified, substituted, combined, or excluded as desired, including across embodiments disclosed herein.

The methods disclosed herein may be performed in the sequence disclosed herein or may be performed out of sequence as desired. Any portion of the methods disclosed herein may be varied, modified, combined, excluded, or substituted as desired.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, devices, and methods as disclosed herein, which is defined solely by the claims. Accordingly, the systems; devices, and methods are not limited to that precisely as shown and described.

Certain embodiments of systems, devices, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, devices, and methods to be practiced otherwise than specifically described herein. Accordingly, the systems, devices, and methods include all modifications and equivalents of the subject matter recited in the claims appended hereto as permitted by applicable law. Moreover, any combination of the above-described embodiments in all possible variations thereof is encompassed by the systems, devices, and methods unless otherwise indicated herein or otherwise clearly contradicted by context.

Groupings of alternative embodiments, elements, or steps of the systems, devices, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, devices, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, devices, and methods and does not pose a limitation on the scope of the systems, devices, and methods otherwise claimed. No language in the present specification should be construed as indicating any non-claimed element essential to the practice of the systems, devices, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, devices, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A system comprising:
   a frame defining a cavity configured to receive a mobile device, the frame having a top surface positioned above and outside of the cavity;
   an outer surface protector for the mobile device, the outer surface protector configured to couple to the top surface of the frame and extend along the cavity and including a protective layer and a backing layer coupled to the protective layer, the protective layer configured to couple to an outer surface of the mobile device, and the backing layer including one or more cuts separating the backing layer into at least two portions including a first portion distal the top surface and a second portion forming a strip of material proximate the top surface, the first portion and the second portion each configured to be selectively separated from the protective layer to expose a respective portion of the protective layer, the second portion having a length and a width, the length being shorter than the width;
   a first tab coupled to the second portion and extending out from a lengthwise edge of the second portion, the first tab configured to separate the second portion from the protective layer when pulled in a widthwise direction relative to the second portion; and
   a second tab configured to couple the outer surface protector to the top surface, the second tab extending over the first tab and having a distal section, the distal section having a width greater than a width of the cavity and defining a flap, the flap not overlapping with the first tab and configured to separate the second tab from the outer surface protector when pulled.

2. The system of claim 1, further comprising a cover layer coupled to the protective layer and sandwiched between the second tab and the protective layer.

3. The system of claim 1, wherein the cavity includes a length, and the outer surface protector includes a width and a length configured to extend along the length of the cavity, and the one or more cuts extend along the width of the outer surface protector.

4. The system of claim 1, wherein the outer surface protector is configured to couple to the top surface of the frame such that the backing layer is positioned between the outer surface of the mobile device and the protective layer when the mobile device is positioned in the cavity.

5. The system of claim 1, wherein the second portion is sized smaller than the first portion.

6. The system of claim 5, wherein the strip of material is adjacent an edge of the backing layer.

7. The system of claim 6, further comprising a wedge coupled to the first portion.

8. The system of claim 7, further comprising an applicator device configured to press towards the wedge to separate the first portion from the protective layer.

9. The system of claim 8, wherein the applicator device comprises a wiper.

10. A system comprising:
    a frame defining a cavity configured to receive a mobile device, the frame having a top surface positioned outside of the cavity;
    an outer surface protector for the mobile device, the outer surface protector configured to couple to the top surface and extend along the cavity and including:
    a protective layer configured to couple to an outer surface of the mobile device,
    a backing layer coupled to the protective layer, the backing layer including one or more cuts separating the backing layer into at least two portions including a first portion distal the top surface and a second portion forming a strip of material proximate the top surface, the first portion and the second portion each configured to be selectively separated from the protective layer to expose a respective portion of the protective layer, the second portion having a length and a width, the length being shorter than the width, and
    a cover layer coupled to the protective layer and positioned on an opposing side of the protective layer relative to the backing layer;
    a first tab coupled to the second portion and extending out from a lengthwise edge of the second portion, the first tab configured to separate the second portion from the protective layer when pulled in a widthwise direction relative to the second portion; and
    a second tab configured to couple the cover layer to the top surface, the second tab extending over the first tab.

11. The system of claim 10, wherein the cavity includes a length and a width, and the outer surface protector includes a width and a length configured to extend along the length of the cavity, and the one or more cuts extend along the width of the outer surface protector.

12. The system of claim 10, wherein the outer surface protector is configured to couple to the top surface of the frame such that the backing layer is positioned between the outer surface of the mobile device and the protective layer when the mobile device is positioned in the cavity.

13. The system of claim 10, wherein the second portion is sized smaller than the first portion.

14. The system of claim 10, wherein the strip of material is adjacent an edge of the backing layer.

15. The system of claim 10, further comprising a wedge coupled to the first portion.

16. The system of claim 15, further comprising an applicator device configured to press towards the wedge to separate the first portion from the protective layer.

17. The system of claim 16, wherein the applicator device comprises a wiper.

18. The system of claim 10, wherein the second tab has a distal section that has a width greater than a width of the cavity and defining a flap, the flap configured to separate the second tab from the outer surface protector when pulled.

* * * * *